(12) United States Patent
Lee et al.

(10) Patent No.: US 9,976,042 B2
(45) Date of Patent: May 22, 2018

(54) CONDUCTIVE PASTE, METHOD FOR FORMING AN INTERCONNECTION AND ELECTRICAL DEVICE

(71) Applicants: Nanyang Technological University, Singapore (SG); Lockheed Martin Corporation, Bethesda, MD (US)

(72) Inventors: Byung Hoon Lee, Singapore (SG); Chee Lip Gan, Singapore (SG); Mei Zhen Ng, Singapore (SG); Alfred A. Zinn, Bethesda, MD (US)

(73) Assignees: Nanyang Technological University, Singapore (SG); Lockheed Martin Corporation, Bethesda, MD (US)

( * ) Notice: Subject to any disclaimer, the term of this patent is extended or adjusted under 35 U.S.C. 154(b) by 0 days. days.

(21) Appl. No.: 15/547,462

(22) PCT Filed: Jan. 29, 2016

(86) PCT No.: PCT/SG2016/050044
§ 371 (c)(1),
(2) Date: Jul. 28, 2017

(87) PCT Pub. No.: WO2016/122412
PCT Pub. Date: Aug. 4, 2016

(65) Prior Publication Data
US 2018/0002540 A1 Jan. 4, 2018

Related U.S. Application Data

(60) Provisional application No. 62/109,785, filed on Jan. 30, 2015.

(51) Int. Cl.
*H01B 5/00* (2006.01)
*H05K 1/09* (2006.01)
(Continued)

(52) U.S. Cl.
CPC .............. *C09D 5/24* (2013.01); *H01B 1/02* (2013.01); *H01B 1/026* (2013.01); *H01B 1/22* (2013.01)

(58) Field of Classification Search
CPC . C09D 5/24; H01B 1/22; H01B 1/026; H01B 1/02
(Continued)

(56) References Cited

U.S. PATENT DOCUMENTS

| 8,486,305 B2 | 7/2013 | Zinn et al. |
| 9,011,570 B2 | 4/2015 | Bedworth et al. |

(Continued)

FOREIGN PATENT DOCUMENTS

| JP | 2006-49106 A | 2/2016 |
| JP | 2006-70300 A | 3/2016 |

(Continued)

OTHER PUBLICATIONS

Chen et al., "Morphology and Bond Strength of Copper Wafer Bonding," *Electrochem. and Solid-State Lett.* 7(1): G14-G16, 2004.
(Continued)

*Primary Examiner* — Sherman Ng
(74) *Attorney, Agent, or Firm* — Seed IP Law Group LLP

(57) ABSTRACT

According to embodiments of the present invention, a conductive paste is provided. The conductive paste has a composition including a plurality of conductive nanoparticles and a plurality of conductive nanowires, wherein a weight ratio of the plurality of conductive nanoparticles to the plurality of conductive nanowires is between about 10:1 and about 50:1. According to further embodiments of the present invention, a method for forming an interconnection and an electrical device are also provided.

20 Claims, 17 Drawing Sheets

(51) Int. Cl.
*C09D 5/24* (2006.01)
*H01B 1/22* (2006.01)
*H01B 1/02* (2006.01)

(58) Field of Classification Search
USPC .............................................. 174/126.2, 257
See application file for complete search history.

(56) References Cited

U.S. PATENT DOCUMENTS

| | | | |
|---|---|---|---|
| 9,072,185 B2 | 6/2015 | Zinn | |
| 2006/0197064 A1 | 9/2006 | Pan et al. | |
| 2008/0261112 A1* | 10/2008 | Nagata | B82Y 10/00 429/218.1 |
| 2011/0031001 A1 | 2/2011 | Ishikawa et al. | |
| 2011/0062389 A1 | 3/2011 | Wang et al. | |
| 2012/0049131 A1 | 3/2012 | Lee et al. | |
| 2014/0004371 A1* | 1/2014 | Chung | H01B 1/02 428/549 |
| 2014/0231718 A1* | 8/2014 | Lin | H01B 1/04 252/503 |
| 2016/0225482 A1* | 8/2016 | Wu | H01B 1/22 |
| 2016/0225483 A1* | 8/2016 | Wu | H01B 1/22 |

FOREIGN PATENT DOCUMENTS

| | | |
|---|---|---|
| KR | 10-2013-0113146 A | 10/2013 |
| WO | 2011/065997 A1 | 6/2011 |

OTHER PUBLICATIONS

Chen et al. "Investigation and Effects of Wafer Bow in 3D Integration Bonding Schemes," *J. Electron. Mat.* 39(12): 3605-2606, 2010.

Fan et al., "Copper Wafer Bonding," *Electrochem. And Solid-State Lett.* 2(10): 534-536, 1999.

Hu et al., "Metal nanogrids, nanowires, and nanofibers for transparent electrodes," *MRS Bull.* 36: 760-765, 2011.

Ishizaki et al., "A new one-pot method for the synthesis of Cu nanoparticles for low temperature bonding," *J. Mater. Chem.* 22: 25198-25206, 2012.

Kim et al., "Effects of sulfide-forming element addition on the Kirkendall void formation and drop impact reliability of Cu/Sn-3.5Ag solder joints," *Acta Mater.* 57: 5001-5012, 2009.

Lee et al., "A Study on the Bonding Process of Cu Bump/Sn/Cu Bump Bonding Structure for 3D Packaging Applications," *J. Electrochem. Soc.* 157 (4):H420-H424, 2010.

Lee et al., "A Study on the Breakdown Mechanism of an Electroless-Plated Ni(P) Diffusion Barrier for Cu/Sn/Cu 3D Interconnect Bonding Structures," *J. Electron. Mat.*41 (1): 109-114, 2012.

Nishikawa et al., "Effects of Joining Conditions on Joint Strength of Cu/Cu Joint Using Cu Nanoparticle Paste," *The Open Surface Science Journal* 3: 60-64, 2011.

Pemberton et al., "The fracture energy of metal fibre reinforced ceramic composites (MFCs)," *Compos. Sci. Technol.* 71: 266-275, 2011.

Peng et al., "Room-temperature pressureless bonding with silver nanowire paste: towards organic electronic and heat-sensitive functional devices packaging," *J. Mater. Chem.* 22: 12997-13001, 2012.

Peng et al., "Reinforcement of Ag nanoparticle paste with nanowires for low temperature pressureless bonding," *J. Mater. Sci.* 47: 6801-6811, 2012.

Yu et al., "Effects of Current Stressing on Formation and Evolution of Kirkendall Voids at Sn-3.5Ag/Cu Interface," *J. Electron. Mat.* 39(8): 1309-1314, 2010.

Zeng et al., "Kirkendall void formation in eutectic SnPb solder joints on bare Cu and its effect on joint reliability," *J. App. Phys.*97: 024508-1-024508-8, 2005. (9 pages).

Zhang et al., "Preparation and properties of silicon carbide ceramics enhanced by TiN nanoparticles and SiC whiskers," *Scripta Mater.* 65: 186-189, 2011.

* cited by examiner

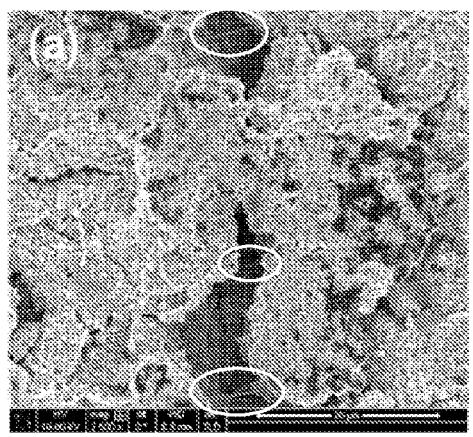
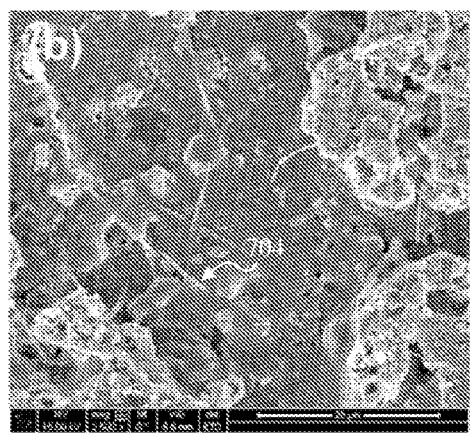
FIG. 7A　　　　　　　　　　　FIG. 7B
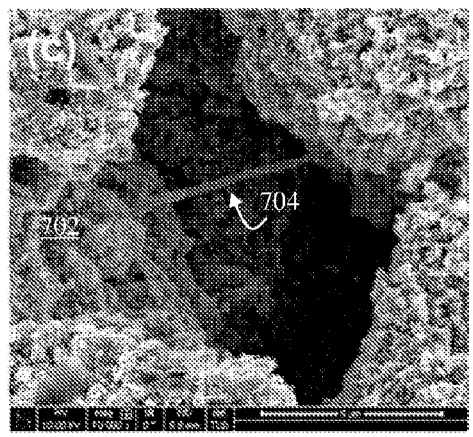
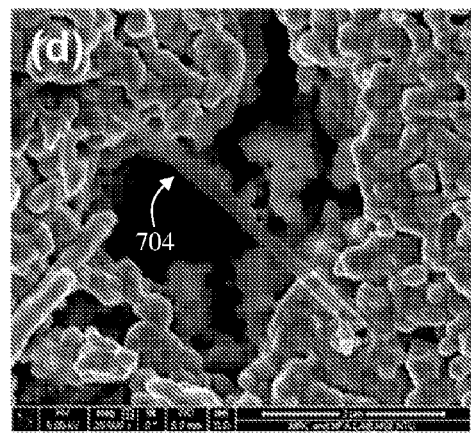
FIG. 7C　　　　　　　　　　　FIG. 7D SEM images taken at "A" (FIG. 10B)

SEM images taken at "B" (FIG. 10B)

CONDUCTIVE PASTE, METHOD FOR FORMING AN INTERCONNECTION AND ELECTRICAL DEVICE

CROSS-REFERENCE TO RELATED APPLICATION

This application claims the benefit of priority of U.S. provisional application No. 62/109,785, filed 30 Jan. 2015, the content of it being hereby incorporated by reference in its entirety for all purposes.

TECHNICAL FIELD

Various embodiments relate to a conductive paste, a method for forming an interconnection and an electrical device.

BACKGROUND

Tin (Sn)-based solders have been the most commonly used lead-free solder for joining microelectronics devices and components. Even at a low process temperature (200-250° C.), the reactions between the solder and copper (Cu) bump, Under Bump Metallizations (UBMs), such as copper (Cu), nickel (Ni), silver (Ag), palladium (Pd), etc., are very aggressive and can cause serious reliability concerns. The formation of intermetallic compounds (IMCs) results in degradation of mechanical properties due to their brittle nature, and a decrease in electrical conductivity due to their higher resistivity than pure metals. The Kirkendall voids which are formed as a consequence of the imbalanced inter-diffusion between different metals also deteriorate the mechanical and electrical properties of the joint. These are the reasons why copper (Cu) has been suggested as an alternative bonding material instead of Sn-based solder. Indeed, Cu to Cu homogeneous joining provides a solution to avoid concerns about complex metallic reactions and the accompanying issues, consequently achieving a high reliability bonding. Nevertheless, there are limitations of Cu to Cu direct bonding. To achieve reliable Cu—Cu thin-film bonding, high temperature and high pressure are required, hence applications to semiconductor processes or electronics packaging is limited.

SUMMARY

According to an embodiment, a conductive paste is provided. The conductive paste may have a composition including a plurality of conductive nanoparticles and a plurality of conductive nanowires, wherein a weight ratio of the plurality of conductive nanoparticles to the plurality of conductive nanowires is between about 10:1 and about 50:1.

According to an embodiment, a method for forming an interconnection is provided. The method may include applying a conductive paste as described herein between a first substrate portion and a second substrate portion, and fusing the plurality of conductive nanoparticles of the conductive paste to each other to interconnect the first substrate portion and the second substrate portion.

According to an embodiment, an electrical device is provided. The electrical device may include a first substrate portion, a second substrate portion, and a conductive member arranged to interconnect the first substrate portion and the second substrate portion, wherein the conductive member is made of the conductive paste as described herein, the conductive paste processed to fuse the plurality of conductive nanoparticles of the conductive paste to each other.

BRIEF DESCRIPTION OF THE DRAWINGS

In the drawings, like reference characters generally refer to like parts throughout the different views. The drawings are not necessarily to scale, emphasis instead generally being placed upon illustrating the principles of the invention. In the following description, various embodiments of the invention are described with reference to the following drawings, in which:

FIG. 3A shows a schematic diagram illustrating chip to substrate bonding using the copper (Cu) paste of various embodiments, while

FIGS. 6A and 6B show scanning electron microscope (SEM) images of copper (Cu) bumps formed from a copper paste with nanowires of various embodiments, while

FIGS. 7A to 7D show scanning electron microscope (SEM) images of the microstructures of the fracture surface of the copper (Cu) nanoparticles (NPs) and nanowires (NWs) composite joining bonded at 200° C.

DETAILED DESCRIPTION

The following detailed description refers to the accompanying drawings that show, by way of illustration, specific details and embodiments in which the invention may be practiced. These embodiments are described in sufficient detail to enable those skilled in the art to practice the invention. Other embodiments may be utilized and structural, logical, and electrical changes may be made without departing from the scope of the invention. The various embodiments are not necessarily mutually exclusive, as some embodiments can be combined with one or more other embodiments to form new embodiments.

Embodiments described in the context of one of the methods or devices are analogously valid for the other methods or devices. Similarly, embodiments described in the context of a method are analogously valid for a device, and vice versa.

Features that are described in the context of an embodiment may correspondingly be applicable to the same or similar features in the other embodiments. Features that are described in the context of an embodiment may correspondingly be applicable to the other embodiments, even if not explicitly described in these other embodiments. Furthermore, additions and/or combinations and/or alternatives as described for a feature in the context of an embodiment may correspondingly be applicable to the same or similar feature in the other embodiments.

In the context of various embodiments, the articles "a", "an" and "the" as used with regard to a feature or element include a reference to one or more of the features or elements.

In the context of various embodiments, the phrase "at least substantially" may include "exactly" and a reasonable variance.

In the context of various embodiments, the term "about" as applied to a numeric value encompasses the exact value and a reasonable variance.

As used herein, the term "and/or" includes any and all combinations of one or more of the associated listed items.

As used herein, the phrase of the form of "at least one of A or B" may include A or B or both A and B. Correspondingly, the phrase of the form of "at least one of A or B or C", or including further listed items, may include any and all combinations of one or more of the associated listed items.

Figure 1A:
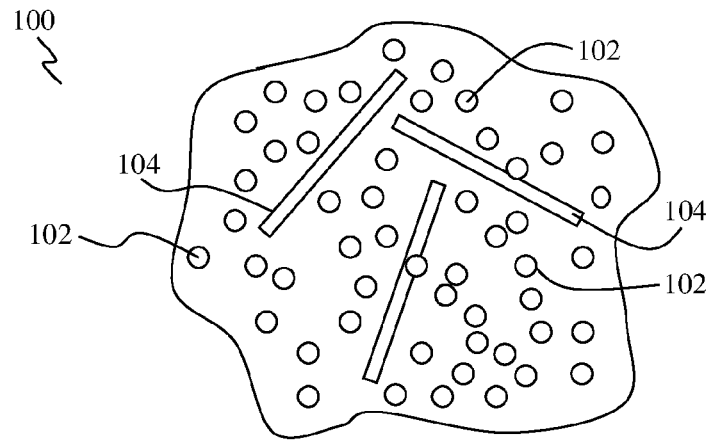
FIG. 1A shows a schematic top view of a conductive paste, according to various embodiments.

FIG. 1A shows a schematic top view of a conductive paste 100, according to various embodiments. The conductive paste 100 has a composition including a plurality of conductive nanoparticles 102 and a plurality of conductive nanowires 104, wherein a weight ratio of the plurality of conductive nanoparticles 102 to the plurality of conductive nanowires 104 is between about 10:1 and about 50:1.

In other words, a conductive paste 100 may be provided. The conductive paste 100 may include a mixture of a plurality of conductive nanoparticles (NPs) 102 and a plurality of conductive nanowires (NWs) 104. The amount of the plurality of conductive nanoparticles (NPs) 102 and the plurality of conductive nanowires (NWs) 104 in the conductive paste 100, or in other words, the composition of the conductive paste 100, may be such that the weight ratio of the plurality of conductive nanoparticles 102 to the plurality of conductive nanowires 104 is between about 10:1 and about 50:1, for example, between about 10:1 and about 40:1, between about 10:1 and about 20:1, between about 20:1 and about 50:1, between about 20:1 and about 40:1, or between about 30:1 and about 50:1. This may mean that the major/main constituent in the conductive paste 100 is the plurality of conductive nanoparticles 102 while the minor constituent in the conductive paste 100 is the plurality of conductive nanowires 104. The plurality of conductive nanoparticles 102 and the plurality of conductive nanowires 104 may be separate or distinct from one another. This may mean that the plurality of conductive nanoparticles 102 are generally not fused to each other within the conductive paste 100. The conductive paste 100 may include residual solvent(s) (e.g., alcohol-based solvent(s)), for example, resulting from the preparation of the conductive paste 100.

In various embodiments, the plurality of conductive nanowires 104 may act as a mechanical strengthening material. Further, the plurality of conductive nanowires 104 may also create pathways in the conductive paste 100 to allow any residual chemical(s) or solvent(s) that may be present in the conductive paste 100 to escape from isolated regions or gaps within the conductive paste 100.

In various embodiments, the weight ratio of the plurality of conductive nanoparticles 102 to the plurality of conductive nanowires 104 may be between about 10:1 and about 40:1, for example, between about 10:1 and about 20:1, between about 20:1 and about 40:1, between about 30:1 and about 40:1, or between about 10:1 and about 40:1, e.g., about 20:1, about 30:1 or optimally at about 40:1.

In various embodiments, the weight ratio of the plurality of conductive nanoparticles 102 to the plurality of conductive nanowires 104 may be about 40:1.

While not wishing to be bound by any theory, in various embodiments, such a high weight ratio of the plurality of conductive nanoparticles 102 to the plurality of conductive nanowires 104 of between about 10:1 and about 50:1, or between about 10:1 and about 40:1, or up to about 40:1, or up to about 50:1 (i.e., a much higher amount of nanoparticles versus nanowires) may be employed because of the selection of the length of the conductive nanowires 104. In various embodiments, as will be described further below, the conductive nanowires 104 employed may have a length of between about 20 µm and about 40 µm. Further, when conductive nanowires 104 of uniform length are used in the conductive paste 100, a higher shear strength may be observed (see FIGS. 10A-10D to be described below).

In the context of various embodiments, each conductive nanoparticle 102 of the plurality of conductive nanoparticles 102 may have a size (or diameter) of between about 5 nm and about 20 nm, for example, between about 5 nm and about 15 nm, between about 5 nm and about 10 nm, between about 10 nm and about 20 nm, or between about 8 nm and about 15 nm. It should be appreciated that there may be a size distribution or variance among the plurality of conductive nanoparticles 102. In some embodiments, the plurality of nanoparticles 102 may have the same (or uniform) size (or diameter).

By having smaller sized nanoparticles (e.g., 5-20 nm, or <10 nm) 102, the processing temperature of a heating process (to be described below) to be carried out for fusion of the plurality of conductive nanoparticles 102 to each other to form an interconnection may be lower (for example 200-280° C.) as compared to larger sized nanoparticles. For example, for nanoparticles with 40-100 nm diameter, the process temperature required may be in the range of 300-350° C. Further, smaller sized nanoparticles (e.g., 5-20 nm, or <10 nm) have been found to drive fusion of the conductive nanoparticles 102 to each other, and with the conductive nanowires 104.

In the context of various embodiments, each conductive nanowire 104 of the plurality of conductive nanowires 104 may have a length of between about 5 µm and about 50 µm, for example, between about 5 µm and about 40 µm, between about 5 µm and about 20 µm, between about 20 µm and about 50 µm, or between about 20 µm and about 40 µm, e.g., about 40 µm. The plurality of nanowires 104 may have the same (or uniform) length.

In the context of various embodiments, each conductive nanowire 104 of the plurality of conductive nanowires 104 may have a diameter of between about 100 nm and about 200 nm, for example, between about 100 nm and about 150 nm, between about 100 nm and about 120 nm, between about 150 nm and about 200 nm, or between about 120 nm and about 150 nm. The plurality of nanowires 104 may have the same (or uniform) diameter.

In the context of various embodiments, each conductive nanowire 104 of the plurality of conductive nanowires 104 may have an aspect ratio of between about 50 and about 500, for example, between about 50 and about 250, between about 50 and about 100, between about 100 and about 500, or between about 100 and about 300. The term "aspect ratio" may mean the length-to-width ratio or length-to-diameter ratio.

In the context of various embodiments, the plurality of conductive nanoparticles 102 and/or the plurality of conductive nanowires 104 may include a metal. The metal may be selected from the group consisting of copper (Cu), silver (Ag) and gold (Au). In various embodiments, the plurality of conductive nanoparticles 102 and the plurality of conductive nanowires 104 may include or may be made of the same metal.

In the context of various embodiments, the plurality of conductive nanoparticles 102 and the plurality of conductive nanowires 104 may include or consist essentially of copper (Cu). This may mean that copper (Cu) may be utilized as the conductive and joining material simultaneously.

In the context of various embodiments, each conductive nanoparticle 102 of the plurality of conductive nanoparticles 102 may be encapsulated with an organic layer. This may mean that each conductive nanoparticle 102 may be coated on its surface with an organic layer. Therefore, the organic layer may be a capping layer or a surfactant. The organic layer may prevent or minimize oxidation of the material of the conductive nanoparticle 102. The organic layer may prevent or minimize agglomeration of the conductive nanoparticles 102. The organic layer may be a polymeric layer. In various embodiments, the organic layer may be removed or volatized in a heating process, for example, during the heating process for fusing the plurality of conductive nanoparticles 102 to each other.

In the context of various embodiments, the organic layer encapsulating each conductive nanoparticle 102 may include an amine or an amine compound, for example, including but not limited to n-heptylamine, n-octylamine, n-nonylamine, or n-decylamine. By capping the conductive nanoparticles 102 with an amine compound, a lower heating temperature may be required for effective "necking"/fusing among the conductive nanoparticles 102 and/or with the conductive nanowires 104, as compared to other capping materials (e.g., polyvinylpyrrolidone (PVP)), which require a higher heating temperature, resulting in a lesser "necking"/fusing among the nanoparticles. Therefore, various embodiments may enable better bonding among the conductive nanoparticles 102, and/or with the conductive nanowires 104, which may lead to better electrical, thermal and mechanical strength in the interconnects.

In various embodiments, the organic amine surfactant on each conductive nanoparticle 102 may include C6-C18 alkylamines. In some embodiments the alkylamine employed may be a C7-C10 alkylamine, although it should be appreciated that a C5 or C6 alkylamine may also be used. Likewise, a C11 or C12 alkyl amine may also be used. The exact size of alkylamine to be employed may be a balance between being long enough to provide an effective inverse micellar structure versus the ready volatility and/or ease of handling. For example, alkylamines with more than 18 carbons, while also usable, may be more difficult to handle because of their waxy character. Alkylamines between C7 and C10, inclusive, represent a good balance of desired properties for ease of use. In various embodiments, the C6-C18 alkylamine may be at least one of n-heptylamine, n-octylamine, or n-nonylamine. While these are all normal chain amines, one skilled in the art will appreciate that some extent of branching may also be used. As a non-limiting example, 7-methyloctylamine may also be used. Without wishing to be bound by theory, the monoalkylamines described above may also serve as ligands in the coordination sphere of the nanoparticles (e.g., copper nanoparticles) 102. However, their ability to dissociate from the copper is facilitated by the single point of attachment.

Various embodiments may employ an N,N'-dialkylethylenediamine which includes a C1-C4 N,N'-dialkylethylenediamine. As bidentate ligands, dialkylethylenediamines may coordinate metal atoms at two nitrogen atoms, which may stabilize the formation of small diameter nanoparticles (e.g., Cu nanoparticles). In some embodiments, the alkyl groups of the C1-C4 N,N'-dialkylethylenediamine may be the same, while in other embodiments, may be different. The C1-C4 alkyl groups may include methyl, ethyl, propyl, butyl, and the like, including normal chain or branched alkyl groups such as iso-propyl, iso-butyl, sec-butyl, and tert-butyl groups. Other bidentate, tridentate, and multidentate ligands may also be employed. For example, N,N'-dialkylpropylenediamines may also be used.

Figure 1B:
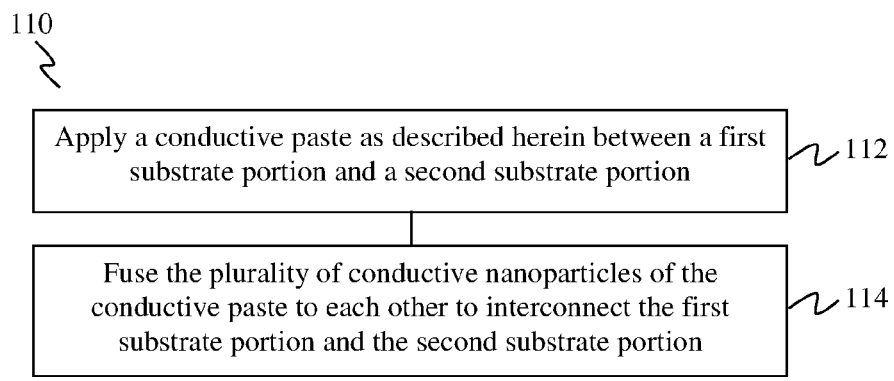
FIG. 1B shows a flow chart illustrating a method for forming an interconnection, according to various embodiments.

FIG. 1B shows a flow chart illustrating a method 110 for forming an interconnection, according to various embodiments.

At 112, a conductive paste as described herein (e.g., 100, FIG. 1A) is applied between a first substrate portion and a second substrate portion. The conductive paste may be applied to one or both of the first substrate portion and the second substrate portion.

At 114, the plurality of conductive nanoparticles of the conductive paste are fused to each other to interconnect the first substrate portion and the second substrate portion. In various embodiments, the plurality of conductive nanoparticles of the conductive paste may also be fused to the plurality of conductive nanowires of the conductive paste.

In the context of various embodiments, the term "interconnection" may mean an electrical interconnection and/or a bonding layer.

By providing the conductive paste between the first substrate portion and the second substrate portion, and subsequently fusing the plurality of conductive nanoparticles of the conductive paste to each other, the first substrate portion and the second substrate portion may be electrically interconnected to each other.

In various embodiments, fusing the plurality of conductive nanoparticles of the conductive paste to each other may interconnect and bond the first substrate portion and the second substrate portion to each other.

In various embodiments, at 114, fusing the plurality of conductive nanoparticles of the conductive paste to each other may form a conductive member to interconnect the first substrate portion and the second substrate portion to each other. This may mean that a conductive member may be formed from the conductive paste after fusing the plurality of conductive nanoparticles in the conductive paste to each other. The conductive member may be a composite material having the plurality of conductive nanoparticles fused to each other and the plurality of conductive nanowires (that may be fused to the plurality of conductive nanoparticles). The conductive member may be in the form of a bump or a pillar.

As described above, the major/main constituent of the conductive paste is the plurality of conductive nanoparticles while the minor constituent of the conductive paste is the plurality of conductive nanowires. Therefore, the plurality of conductive nanoparticles are the major material for bonding and/or interconnection, and the plurality of conductive nanowires are the assistant material for improving properties of the bonding and/or interconnection.

The plurality of conductive nanowires may act as a mechanical strengthening material. For example, the plurality of conductive nanowires may act as barriers to the propagation of crack(s) that may occur in the fused plurality of conductive nanoparticles or in the conductive member, and therefore may retard the increase in the crack area, thereby improving the mechanical properties. The plurality of conductive nanowires may also create pathways in the conductive paste and/or the conductive member to allow any residual chemical(s) or solvent that may be present to escape from isolated regions or gaps within the conductive paste and/or the conductive member.

In various embodiments, at 114, in order to fuse the plurality of conductive nanoparticles of the conductive paste to each other, the conductive paste may be subjected to a heating process. This may mean that a heat treatment may be carried out to fuse the plurality of conductive nanoparticles to each other. This also means that the heating process is carried out after the conductive paste has been applied between the first substrate portion and the second substrate portion. As the conductive paste is subjected to the heating process, the plurality of conductive nanoparticles and plurality of conductive nanowires are subjected to the heating process. The heating process may be carried out in a tube furnace, a vacuum oven, a reflow oven (optimum), etc. The environment in which the heating process may be performed may include an inert gas (nitrogen, $N_2$, or argon, Ar) (optimum) or may be a vacuum.

In various embodiments, the heating process may be carried out for a predetermined duration between about 6 minutes and about 30 minutes, for example, between about 6 minutes and about 20 minutes, between about 6 minutes and about 10 minutes, between about 10 minutes and about 30 minutes, between about 10 minutes and about 20 minutes, or between about 6 minutes and about 8 minutes, e.g., optimally for about 6 minutes.

In various embodiments, a predetermined peak (or maximum) temperature of the heating process may be between about 200° C. and about 350° C., for example, between about 200° C. and about 300° C., between about 200° C. and about 280° C., between about 200° C. and about 250° C., between about 250° C. and about 350° C., between about 250° C. and about 280° C., or between about 220° C. and about 250° C., e.g., about 200° C. or optimally at about 280° C. Accordingly, therefore, a low temperature processing method may be provided.

In various embodiments, the heating process at the predetermined peak temperature may be carried out for a predetermined duration of between about 90 seconds and about 10 minutes, for example, between about 90 seconds and about 5 minutes, between about 90 seconds and about 3 minutes, between about 3 minutes and about 10 minutes, between about 3 minutes and about 5 minutes, between about 5 minutes and about 10 minutes, or between about 2 minutes and about 4 minutes, e.g., optimally for about 90 seconds. As non-limiting examples, in a tube furnace, for heating at a predetermined peak temperature of about 200-350° C., the predetermined duration may be about 10 minutes, while in a reflow oven, for heating at a predetermined peak temperature of about 200-300° C., the predetermined duration may be about 90 seconds.

In various embodiments, the heating process may volatize the residual solvent(s) that may be present or trapped in the conductive paste and/or the capping layer(s) (e.g., chemicals or organic layer(s)) that may be present on the plurality of conductive nanoparticles so as to achieve a better bonding performance.

In various embodiments, no mechanical pressure is applied to interconnect and/or bond the first substrate portion and the second substrate portion to each other. This may mean that no mechanical pressure is necessarily required to be applied in order to interconnect and/or bond the first substrate portion and the second substrate portion to each other. However, it should be appreciated that, in some embodiments, mechanical pressure may be applied.

In various embodiments, the first substrate portion and the second substrate portion may be comprised in a single continuous substrate.

In various embodiments, the first substrate portion and the second substrate portion may be respectively comprised in separate substrates arranged one over the other.

In various embodiments, the method may include forming the conductive paste including providing a plurality of conductive nanoparticles, providing a plurality of conductive nanowires, and mixing the plurality of conductive nanoparticles and the plurality of conductive nanowires in a solvent. The solvent may include an alcohol. The alcohol may include at least one of isopropyl alcohol (IPA), pentane, heptanol, or hexanol. Heptanol or hexanol may be used for optimum conditions.

In various embodiments, at least some, or most, of the solvent may be removed, evaporated or volatized during the heating process for fusing the plurality of conductive nanoparticles to each other. The heating temperature of the heating process is higher than the boiling point of the solvent.

In various embodiments, the plurality of conductive nanowires may be provided by forming the plurality of conductive nanowires by means of an electroplating method using an anodic aluminum oxide (AAO) as a template. The anodic aluminum oxide (AAO) may include holes or pores or channels into which the material for the plurality of conductive nanowires may be electroplated to form the plurality of conductive nanowires. The plurality of conductive nanowires may then be extracted or removed from the anodic aluminum oxide template. By employing an anodic aluminum oxide (AAO) (or anodized aluminum oxide (AAO)) as a template, a uniform distribution of the size (e.g., length and/or diameter) of the plurality of conductive nanowires may be obtained.

It should be appreciated that, in general, the method may include mixing, where the plurality of conductive nanoparticles and the plurality of conductive nanowires may be mixed (e.g., in a solvent), and thereafter, dispersing the mixed paste onto at least one substrate (or substrate portion) and followed by heating of the conductive paste, for example, to fuse the plurality of conductive nanoparticles to each other. The plurality of conductive nanoparticles may also fuse to the plurality of conductive nanowires.

While the method described above is illustrated and described as a series of steps or events, it will be appreciated that any ordering of such steps or events are not to be interpreted in a limiting sense. For example, some steps may occur in different orders and/or concurrently with other steps or events apart from those illustrated and/or described herein. In addition, not all illustrated steps may be required to implement one or more aspects or embodiments described herein. Also, one or more of the steps depicted herein may be carried out in one or more separate acts and/or phases.

Figure 1C:
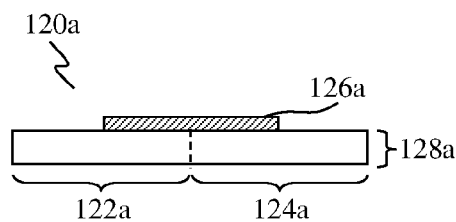
FIGS. 1C and 1D show schematic cross sectional views of an electrical device, according to various embodiments.
Figure 1D:
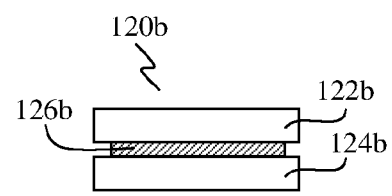

FIGS. 1C and 1D show schematic cross sectional views of an electrical device 120a, 120b, according to various embodiments. The electrical device 120a, 120b includes a first substrate portion 122a, 122b, a second substrate portion 124a, 124b, and a conductive member 126a, 126b arranged to interconnect the first substrate portion 122a, 122b and the second substrate portion 124a, 124b, wherein the conductive member 126a, 126b is made of the conductive paste as described herein (e.g., 100, FIG. 1A), the conductive paste processed (e.g., heat treated) to fuse the plurality of conductive nanoparticles (e.g., 102, FIG. 1A) of the conductive paste to each other.

In other words, an electrical device 120a, 120b may be provided. The electrical device 120a, 120b may include a first substrate portion 122a, 122b, a second substrate portion 124a, 124b, and a conductive member arranged in between the first substrate portion 122a, 122b and the second substrate portion 124a, 124b. The plurality of conductive nanoparticles of the conductive paste may be fused to each other (resulting in the conductive member 126a, 126b) to interconnect the first substrate portion 122a, 122b and the second substrate portion 124a, 124b to each other. Therefore, the conductive member 126a, 126b may electrically interconnect the first substrate portion 122a, 122b and the second substrate portion 124a, 124b to each other. In various embodiments, the conductive member 126a, 126b may electrically interconnect and bond the first substrate portion 122a, 122b and the second substrate portion to each other 124a, 124b. In this way, the conductive member 126a, 126b may act as an electrical interconnection and/or a bonding member.

In various embodiments, within the conductive member 126a, 126b, the plurality of conductive nanoparticles of the conductive paste may also be fused to the plurality of conductive nanowires of the conductive paste.

In various embodiments, the conductive member 126a, 126b may be a composite material having the plurality of conductive nanoparticles fused to each other and the plurality of conductive nanowires (that may be fused to the plurality of conductive nanoparticles).

The plurality of conductive nanowires in the conductive member 126a, 126b may act as a mechanical strengthening material. For example, the plurality of conductive nanowires may act as barriers to the propagation of crack(s) that may occur in the fused plurality of conductive nanoparticles in the conductive member 126a, 126b and therefore may retard the increase in the crack area, thereby improving the mechanical properties.

In various embodiments, each of the first substrate portion 122a, 122b and the second substrate portion 124a, 124b may include a conductive portion or an electrical circuit. The conductive member 126a, 126b may be arranged to interconnect the respective conductive portions (electrical circuits) of the first substrate portion 122a, 122b and the second substrate portion 124a, 124b to each other.

As shown in FIG. 1C, the first substrate portion 122a and the second substrate portion 124a may be comprised in a single continuous substrate 128a. This may mean that the first substrate portion 122a and the second substrate portion 124a may be part of a single continuous substrate 128a, and therefore refer to separate portions of the single continuous substrate 128a.

As shown in FIG. 1D, the first substrate portion 122b and the second substrate portion 124b may be comprised in separate substrates arranged one over the other. This may mean that the first substrate portion 122b and the second substrate portion 124b may be separate substrates themselves or may be part of respective separate substrates.

In various embodiments, the conductive member 126a, 126b may be or may include a bump or a pillar.

In the context of various embodiments, the term "conductive" may include "electrically conductive" and/or "thermally conductive".

In the context of various embodiments, the terms "fuse" and "fusing" may mean sintering, or joining together as an (single) entity. This may mean that there may not be clear or obvious boundary observable between two materials (or structures) when the two materials are fused to each other. Further, the two materials fused to each other may not be separate or distinct.

It should be appreciated that descriptions in the context of the conductive paste 100 and the electrical device 120a, 120b may be correspondingly applicable to each other, and may also be correspondingly applicable in relation to the method for forming an interconnection, and vice versa.

Various embodiments may provide a copper nanoparticles-nanowires mixture for electronics joining. The copper nanoparticle-nanowire mixture may provide a solution or approach for low temperature and low pressure bonding in microelectronics applications.

Various embodiments may include the addition of copper nanowires (Cu NWs) to copper nanoparticles (Cu NPs) as a mechanical strengthening material. At low temperature bonding at about 200° C., the nanoscale NPs do not show sufficient mechanical reliability. Although they have started to neck and fuse, the sintered Cu nanoparticles may still have pores between them and may not achieve 100% densification. Thus, cracks may propagate easily along the fused regions of the NPs. As growth of a crack area leads to a reduction in bonding area, the mechanical properties, as well as the electrical and thermal properties, may be severely degraded with crack propagation. In various embodiments, the added Cu nanowires behave as a barrier to crack propagation in the fused Cu nanoparticles and retard the increase in crack area.

Furthermore, the Cu nanowires have another important role besides strengthening the nanoparticles joint. The solvent that is mixed with the Cu nanoparticles paste should be completely removed through volatilization above a certain temperature for effective sintering of the nanoparticles. However, much of the solvent may remain trapped around the Cu nanoparticles and this may degrade the mechanical and electrical properties of the joint. This will be especially true for large joints where the solvents have a much larger distance to travel before reaching a "free" surface. In various embodiments, the additional Cu nanowires introduced create pathways through which residual chemicals (e.g., solvents) may escape from the isolated regions. Therefore, the two effects described above may enable Cu NPs bonding to be much more stable and reliable, which may allow it to be extended to various forms of joining in electronics applications.

As described above, copper-to-copper (Cu-to-Cu) homogeneous interconnection with copper nanoparticles (Cu NPs) or paste is an attractive approach to make an electrical joint at low temperature and without the use of pressure. In various embodiments, Cu is utilized as the conductive and joining material simultaneously. By using only Cu as a metallization, bump and joining material, aggressive interdiffusion and reaction between heterogeneous materials can be avoided. For that reason, some researchers proposed Cu direct bonding with Cu paste, but the process still requires high temperature to achieve the acceptable mechanical strength. There were attempts to add wires, fibers or whiskers with the particles and power sintering to achieve low temperature high stability bonding. A recent research has been reported on electrode and interconnecting materials using silver (Ag) nanowires, where the manufacturing process of the nanowires is by chemical synthesis, and thus the nanowires are not refinable and controllable. However, the present inventors have found that the length and distribution of nanowires are very sensitive and may be critical variables in the properties of the NP-NW mixture, and in the mechanical and electrical properties of bonding or interconnection. In other words, in order to accomplish highly stable and reliable bonding with metallic nanowires (NWs), it may be required to utilize uniform length, diameter and sufficiently long nanowires. In various embodiments, the copper nanowires (Cu NWs) may be grown to the desired length and added to nanoparticles (NPs) in an optimal ratio. As a result, a high reliable joining in mechanical property, even at a low temperature (200° C.), may be achieved.

In various embodiments, copper nanoparticles (Cu NPs) and copper nanowires (Cu NWs) are mixed at an appropriate ratio (e.g., weight ratio) to address the above-mentioned challenges. In various embodiments, Cu NPs are employed as the main conductive and joining material with the Cu NWs as a strengthening material between the NPs.

In various embodiments, the copper (Cu) nanoparticles employed in various embodiments may be chemically synthesized with size <10 nm, that have a protective polymeric layer. The copper nanoparticles (Cu NPs) may be formed using the method described in PCT/US2010/039069, the entire disclosure of which is incorporated herein by reference.

Figure 2A:
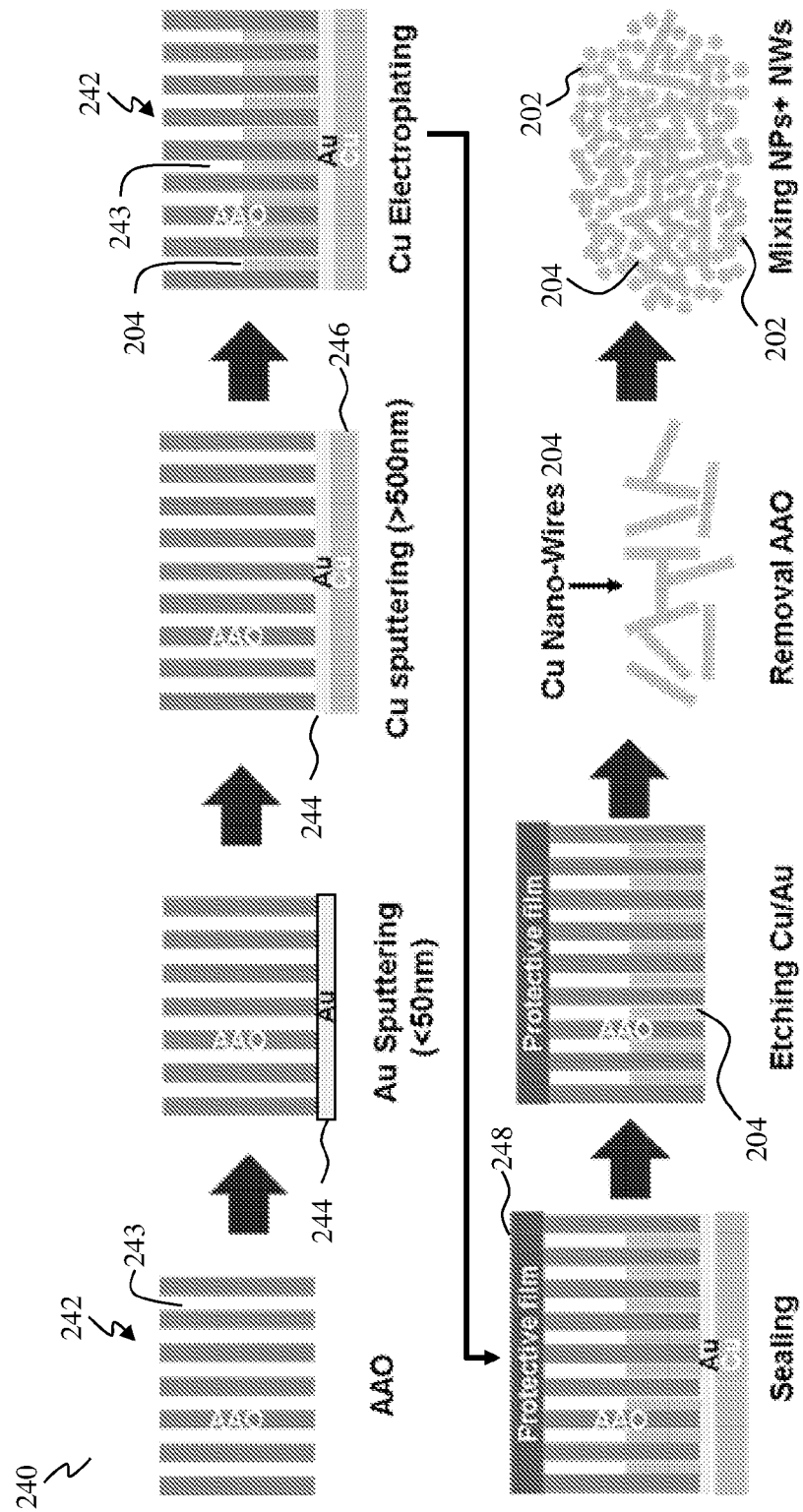
FIG. 2A shows, as cross-sectional views, various processing stages of a method of manufacturing copper (Cu) nanowires (NWs) and mixture with copper (Cu) nanoparticles (NPs), according to various embodiments.

FIG. 2A shows, as cross-sectional views, various processing stages of a method 240 of manufacturing copper (Cu) nanowires (NWs) and mixture with copper (Cu) nanoparticles (NPs), according to various embodiments, illustrating a procedure of manufacturing of Cu NWs using anodized aluminum oxide (AAO). In general, gold/copper (Au/Cu) layers may be deposited on the AAO as a seed layer for electroplating. Cu may subsequently be electroplated into the holes in the AAO. Then, the seed layers and the AAO may be etched away by the respective chemical etchants. Finally, the Cu NWs may be detached. As the Cu nanowires are produced through electroplating using anodic aluminum oxide (AAO) as a template, a narrow distribution in the length of the NWs may be obtained and the length of NWs and the weight ratio of NPs/NWs may be controlled. While it is described herein that the electroplating method with AAO as a template may be used to obtain the Cu nanowires, it should be appreciated that uniform Cu nanowires which may be produced by other methods such as chemical synthesis, vapor-liquid-solid method or chemical vapor deposition may also be applied in various embodiments. However, NWs which have a broader variation in length and radius may be less effective and the process window could be wider in optimizing the ratio and maximum effect. Finally, the Cu NWs may be added to Cu NPs and the two materials may be mixed in a solvent, and then washed with an alcohol based solution.

As a non-limiting example, referring to FIG. 2A, for producing nanowires, an anodic aluminum oxide (AAO) template 242 may first be provided or prepared. The AAO template 242 may have a plurality of holes (or pores or channels) 243. The AAO template 242 may be sputtered with Au and Cu, where a 0.2 nm thick gold layer 244 and a 1 μm thick copper layer 246 may be obtained.

The AAO template 242 may then be attached onto a cathode (not shown) and 50 μm long Cu nanowires 204 may be electrochemical synthesized in the holes 243 of the AAO template 242.

The AAO template 242 may be attached to a protective film (e.g., a thermal tape) 248. The sputtered Cu layer 246 and Au layer 244 may be etched away by chemical etching processes. The AAO template 242 may be etched using a sodium hydroxide (NaOH) solution. As a result, free Cu nanowires 204 may be obtained. The Cu nanowires 204 may then be washed with ethanol, followed by isopropyl alcohol (IPA).

Figure 2B:
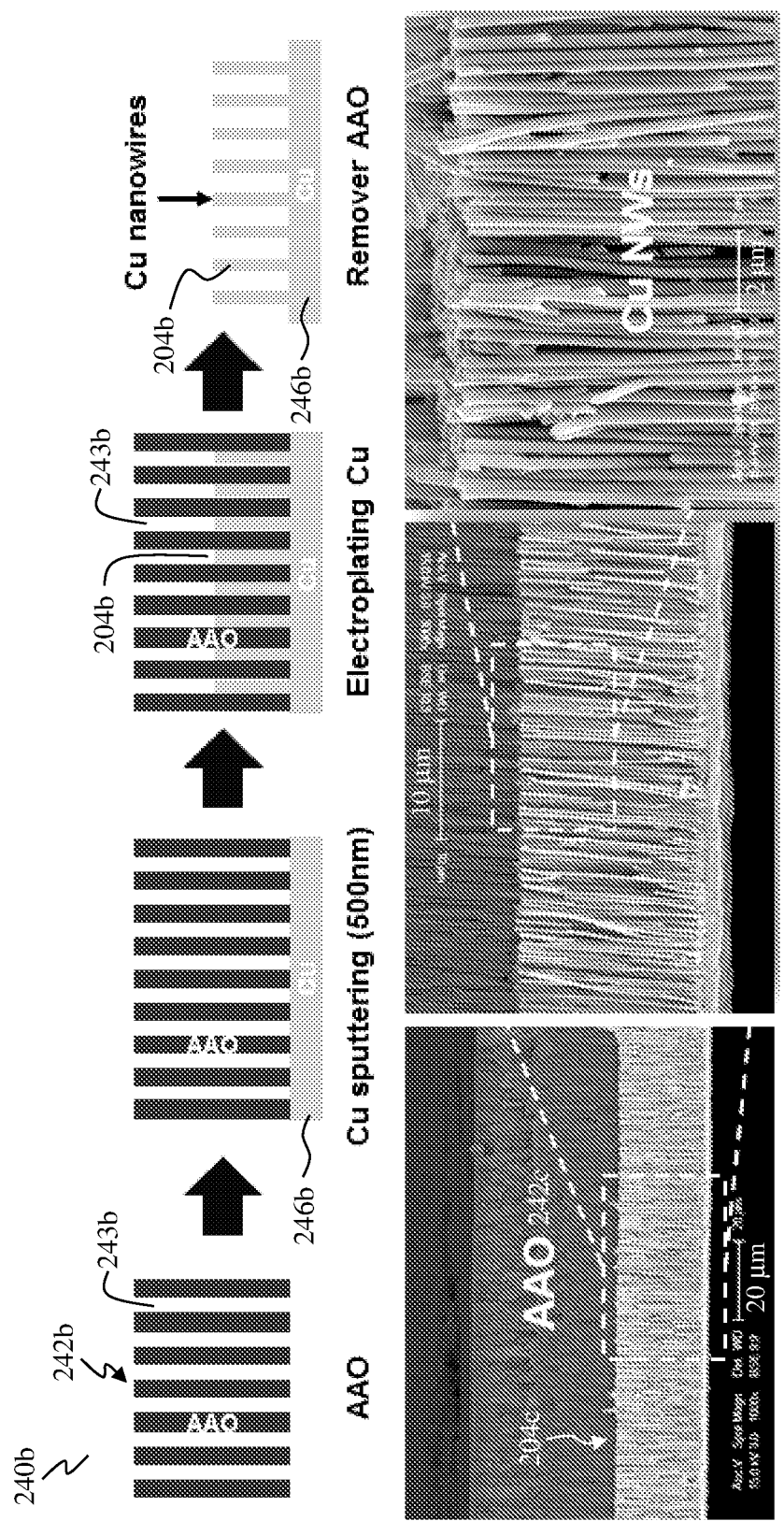
FIG. 2B shows, as cross-sectional views, various processing stages of a method of manufacturing copper (Cu) nanowires, according to various embodiments.

FIG. 2B shows, as cross-sectional views, various processing stages of a method 240b of manufacturing copper (Cu) nanowires, according to various embodiments. An anodic aluminum oxide (AAO) template 242b, having a plurality of holes (or pores or channels) 243b, may be provided or prepared. The AAO template 242b may be sputtered with a 500 nm thick copper (Cu) layer 246b (as a seed layer). The AAO template 242b may then be attached onto a cathode (not shown) and 50 μm long Cu nanowires 204b may be electrochemical synthesized in the holes 243b of the AAO template 242b. The AAO template 242b may then be removed, for example, by etching using a sodium hydroxide (NaOH) solution. As a result, Cu nanowires 204b may remain on the Cu layer 246b. Subsequently, the Cu nanowires 204 may be removed from the Cu layer 246b and washed.

Figure 2C:
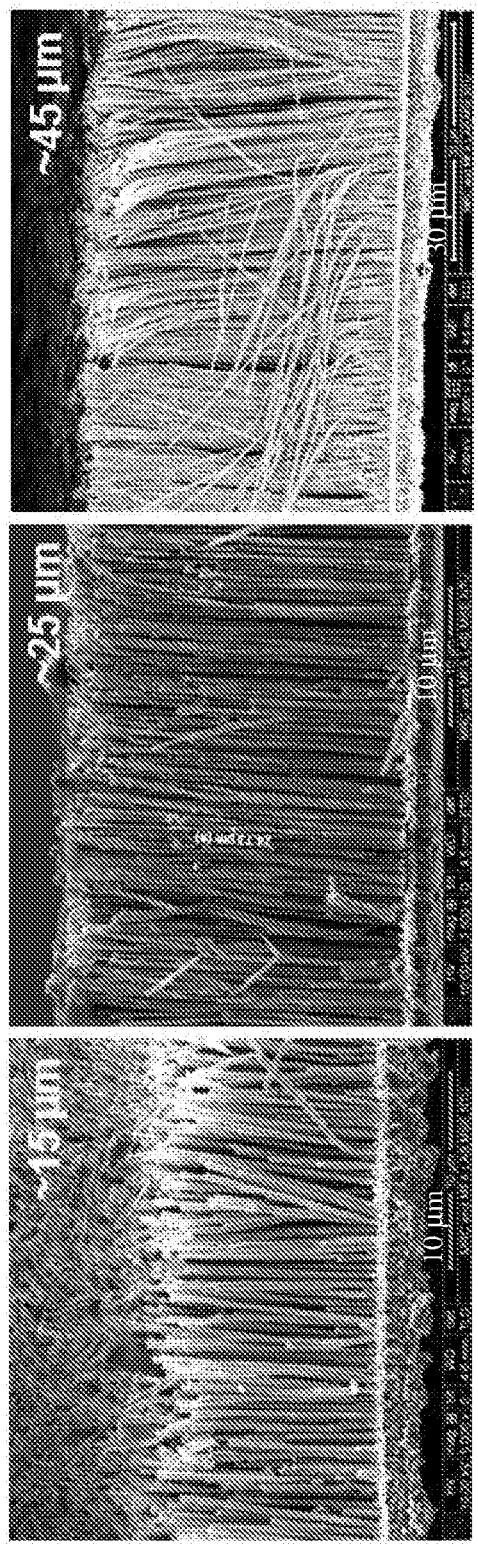
FIG. 2C shows scanning electron microscope (SEM) images of copper nanowires (Cu NWs), according to various embodiments.

FIG. 2B also shows scanning electron microscope (SEM) images of copper nanowires (Cu NWs) 204c that are formed using an AAO template 242c. Examples of copper nanowires (Cu NWs) that are formed, after removal of the AAO template, are shown in the scanning electron microscope (SEM) images of FIG. 2C illustrating Cu NWs having lengths of about 15 μm, about 25 μm and about 45 μm.

As described, fine Cu nanowires may be formed by electroplating using anodic aluminum oxide (AAO). The diameter and length of the nanowires may be adjusted depending on the AAO (hole) size and/or the plating condition(s). For example, the length of the nanowires may be adjusted easily up to about 50 Nanowires with extremely high aspect ratio (e.g., about 50-250) may be achieved. Further, nanowires such as Cu nanowires grown using AAO may exhibit very uniform diameter and length. Growing nanowires using AAO offers a fast, simple and low cost process.

Referring back to FIG. 2A, Cu nanowires 204 and Cu nanoparticles 202 may be mixed together for forming a conductive paste. As non-limiting examples, for preparing a mixture of nanoparticles and nanowires, about 2 g of copper nanoparticles may be weighed and may be provided into a sample holder. A washing solution (e.g., alcohol based solvent) may be added into the sample holder. The sample containing the copper nanoparticles and the solvent may be placed in an ultrasonic bath for about 30 seconds. About 0.04 g of copper nanowires may then be weighed and added into the sample holder, with the sample subsequently placed in an ultrasonic bath for about 30 seconds. The sample or mixture may be centrifuged, and the solution or solvent drained from the sample holder. Optionally, another round of washing may be performed, by adding another washing solution (e.g., alcohol based solvent) into the sample holder, where the solvent may be subsequently removed. The resulting paste of copper nanoparticles and copper nanowires may be transferred to a syringe to facilitate deposition of the paste.

Figure 2D:
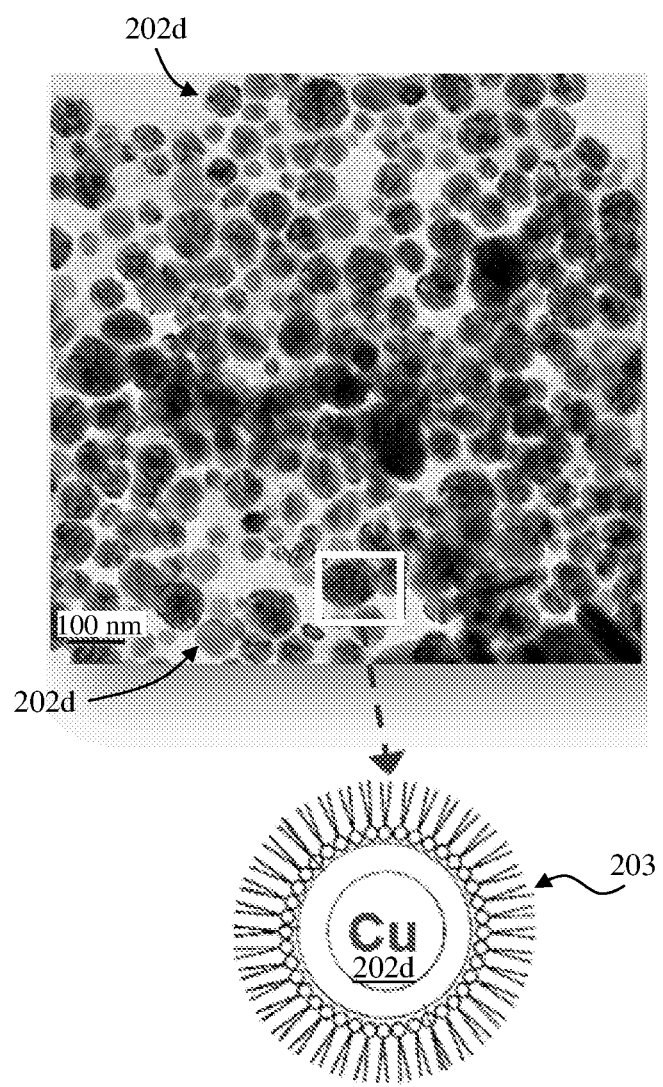
FIG. 2D shows a transmission electron microscope (TEM) image of copper nanoparticles (Cu NPs) and a schematic diagram of an individual copper nanoparticle, according to various embodiments.

FIG. 2D shows a transmission electron microscope (TEM) image of copper nanoparticles (Cu NPs) 202d that may be used in various embodiments. The copper nanoparticles (Cu NPs) 202d may be formed, for example, following the method described in PCT/US2010/039069. FIG. 2D further shows a schematic diagram of an individual copper nanoparticle 202d, which may be encapsulated with an organic layer (e.g., a polymeric layer) 203. The organic layer 203 may include an amine or an amine compound.

Figure 2E:
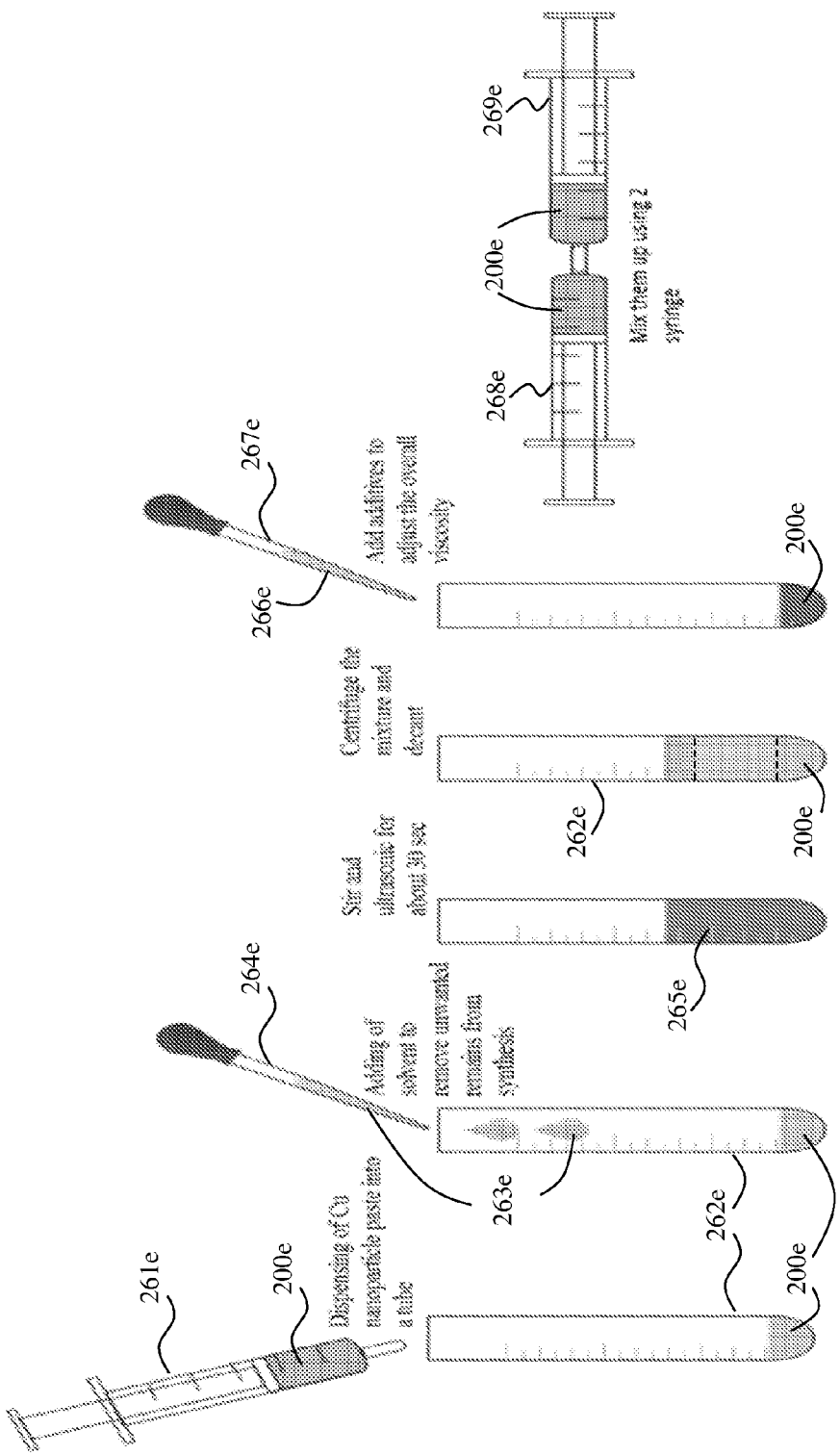
FIG. 2E shows schematic diagrams of a method for washing a copper (Cu) nanoparticle paste, according to various embodiments.

FIG. 2E shows schematic diagrams of a method for washing a (nano) copper (Cu) nanoparticle paste, according to various embodiments illustrating the washing process of the nanoparticles. A copper nanoparticle paste 200e having copper nanoparticles (no nanowires in the nanoparticle paste 200e) may be dispensed from a syringe 261e into a tube 262e. A solvent (e,g., alcohol based solvent) 263e may be dispensed from a dispenser 264e into the tube 262e. The solution or mixture 265e containing the copper nanoparticle paste 200e and the solvent 263e may then be stirred and mixed using an ultrasonicator for about 30 seconds. The mixture 265e may then be centrifuged and decanted, where, as a result, the Cu nanoparticle paste 200e may be at the bottom of the tube 262e to allow the liquid in the mixture 265e to be removed. One or more additives 266e may be dispensed from a dispenser 267e to be added into the tube 262e to adjust the viscosity of the Cu nanoparticle paste 200e. Subsequently, the Cu nanoparticle paste 200e may be mixed using two syringes 268e, 269e, for example, by moving the Cu nanoparticle paste 200e between the syringes 268e, 269e. Thereafter, copper nanowires may be mixed in with the washed Cu nanoparticle paste 200e, for example, as may be described below with reference to FIG. 2F. In general, the overall process flow may be nanoparticles (raw material)→washing→mixing with nanowires→dispersing (e.g., on a substrate)→heating.

The additive(s) (for example called a mixing matrix) 266e may include one or more organic solvents such as a hydrocarbon, an alcohol, an organic acid or an amine, or a mixture thereof. As non-limiting examples, the alcohol may include butanol, octanol, propanol, nonanol, decanol. The additive(s) 266e, additionally or alternatively, may include glycerols like propylene glycol, glycerol, and/or a surfactant such as span20 (sorbitan monolaurate).

Figure 2F:
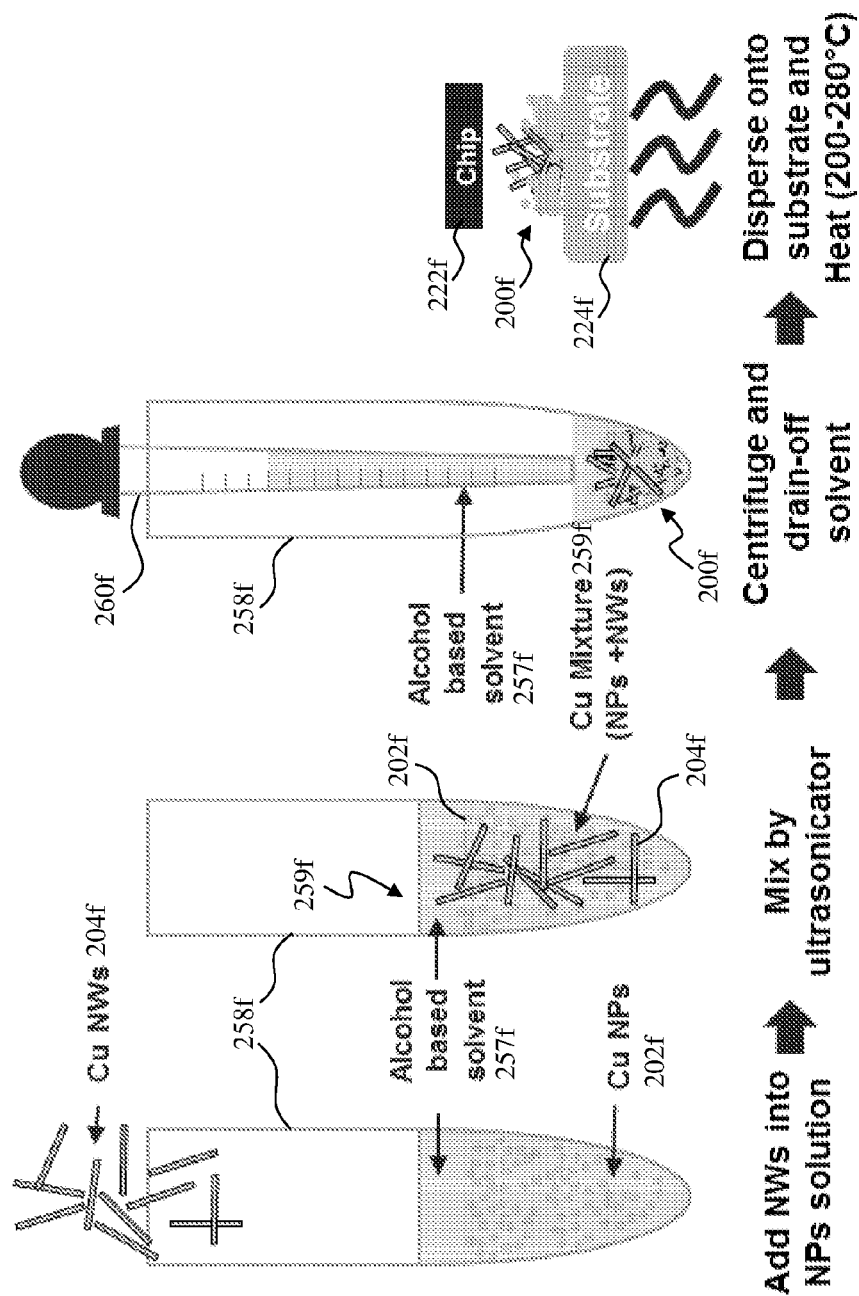
FIG. 2F shows schematic diagrams of a method for forming an interconnection, according to various embodiments.

FIG. 2F shows schematic diagrams of a method for forming an interconnection, according to various embodiments. Copper (Cu) nanoparticles 202f may be dispersed in an alcohol based solvent 257f in a container 258f Copper (Cu) nanowires 204f may be added into the alcohol based solvent 257f to form a solution 259f containing the Cu nanowires 204f, the Cu nanoparticles 202f and the alcohol based solvent 257f, which may then be mixed by an ultrasonicator. Then, the solution 259f may be centrifuged and the alcohol based solvent 257f may be removed or drained off, for example, using a syringe 260f, so as to leave behind a conductive paste 200f in the container 258f. The conductive paste 200f, or part thereof, may then be deposited or dispersed between a substrate 224f and a chip 222f, for example, dispersed onto the substrate 224f. A heating process may then be carried out (e.g., at a temperature between about 200° C. and about 280° C.), for example, from below the substrate 224f. As a result of the heating process, the Cu nanoparticles 202f in the conductive paste 200f may fuse to one another, resulting in the formation of a conductive member between the substrate 224f and the chip 222f, where the conductive member may electrically interconnect and bond the substrate 224f and the chip 222f to each other. Also, as a result of the heating process, any residual alcohol based solvent 257f that may be present in the conductive paste 200f may be evaporated.

In various embodiments, the weight ratio of the Cu nanoparticles 202f to the Cu nanowires 204f may be between about 10:1 and about 40:1, where the weight ratio of about 40:1 is an optimum weight ratio. The heating process may be carried out to a peak temperature of between about 200° C. and about 280° C., where the heating duration at the peak temperature may be about 90 seconds.

Figure 2G:
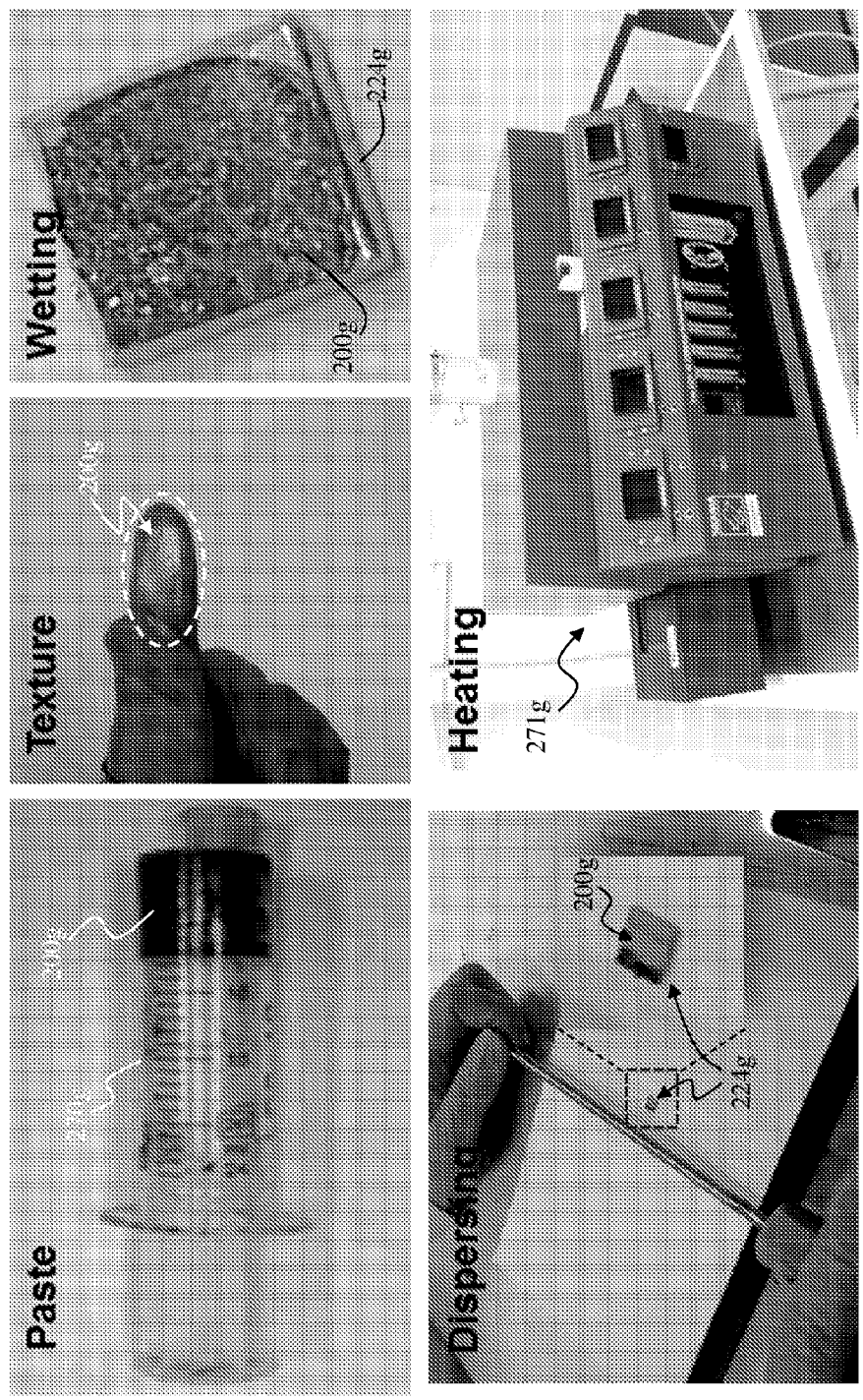
FIG. 2G shows photographs illustrating examples of some steps of the processing method of various embodiments.

FIG. 2G shows photographs illustrating examples of some steps of the processing method of various embodiments. FIG. 2G shows a copper paste (NPs+NWs) 200g provided in a syringe 270g, from which the copper paste 200g may be applied onto a substrate 224g. The copper paste 200g may be dispersed on the substrate 224g. An additional substrate (not shown) may be placed over the substrate 224g with the copper paste 200g in between and subjected to a heating process in a heating apparatus 271g to interconnect the substrate 224g with the additional substrate.

It should be appreciated that the methods or steps described in the context of FIGS. 2A-2G respectively may be applicable also to other methods or steps of FIGS. 2A-2G, or may be combined in any manner.

In various embodiments, the copper paste (e.g., 200f, FIG. 2F) of various embodiments may be stable for more than 6 months. Further, low temperature (<200° C.) and pressureless bonding between substrates may be performed using the copper paste of various embodiments.

In various embodiments, the conditions for interconnection or bonding may include:
  solvent for mixing nanoparticles (NPs) and nanowires (NWs) may be an alcohol based solvent such as isopropyl alcohol (IPA), pentane, heptanol (optimum condition), hexanol (optimum condition), etc.;
  weight ratio of NPs:NWs=20:1. 30:1, 40:1 (optimum condition);
  peak heating temperature of about 200 to about 280° C. (optimum condition);

heating duration of about 6 minutes (optimum condition) to about 30 minutes;
heating duration of about 90 seconds (optimum condition) to about 10 minutes at the peak heating temperature;
heating environment may include an inert gas ($N_2$ or Ar) (optimum condition) or vacuum;
heater apparatus may include tube furnace, reflow oven (optimum condition), vacuum oven, etc.
free of mechanical pressure for bonding (optimum condition).

Figure 3A:
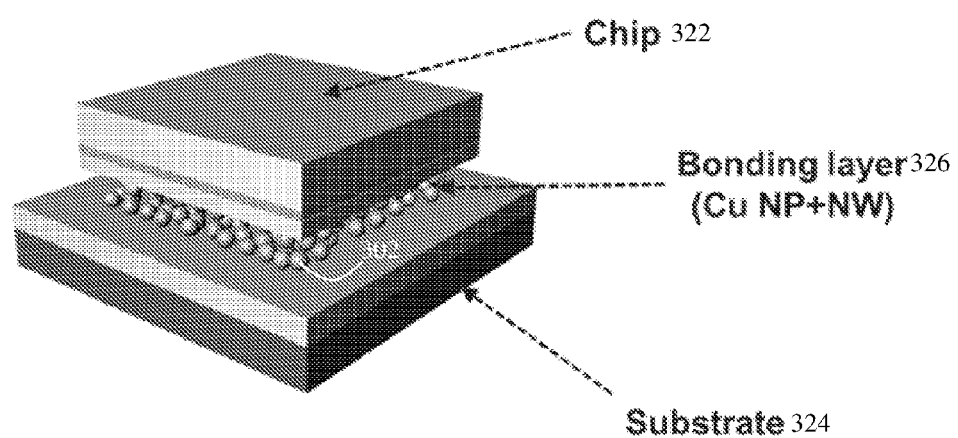

FIG. 3A shows a schematic diagram illustrating chip 322 to substrate 324 bonding using the copper (Cu) paste (NPs+NWs) of various embodiments. In this way, the chip or package 322 may be assembled on the substrate 324 using the paste (or composite material) containing nanoparticles 302 and nanowires (not shown in FIG. 3A) to form a bonding layer 326. The bonding layer 326 may be a conductive member (foormed from the conductive paste) that interconnects the chip 322 and the substrate 334.

Figure 3B:
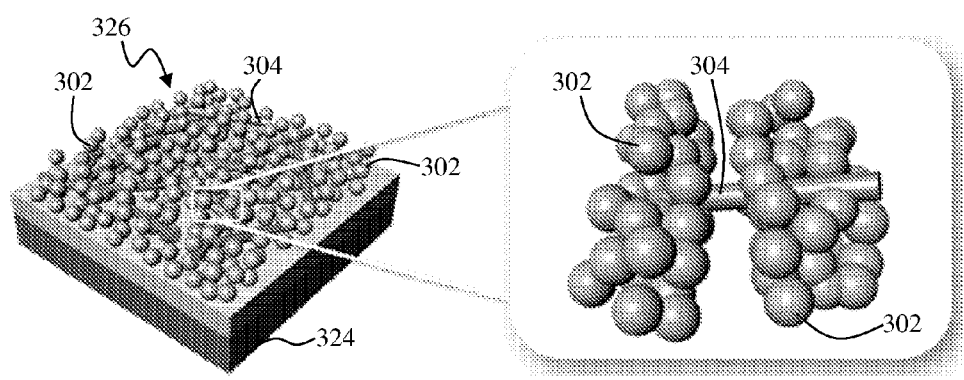
FIG. 3B shows schematic diagrams of the bonding layer dispersed on the substrate.

FIG. 3B shows schematic diagrams of the copper (Cu) composite materials of Cu NPs+NWs, as a composite bonding layer (or conductive member) 326, dispersed on the substrate 334 (with the chip 322 removed for easier understanding and clarity purposes). FIG. 3B also shows an enlarged view of a part of the copper (Cu) bonding layer 326 to illustrate the microstructure of the mixed Cu NWs 304 and Cu NPs 302. While not clearly illustrated, the NPs 302 are fused to each other. The NPs 302 may also be fused to the NWs 304.

Figure 4A:
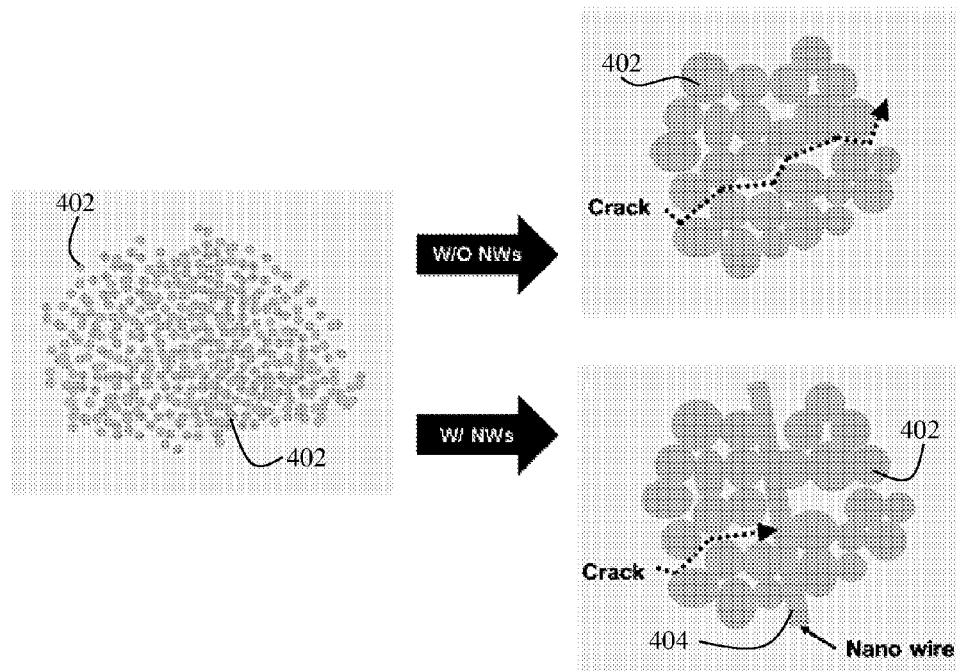
FIG. 4A shows schematic diagrams illustrating the strengthening mechanism of the mixture of nanowires and nanoparticles of various embodiments.

FIG. 4A shows schematic diagrams illustrating the strengthening mechanism of the mixture of nanowires 404 and nanoparticles 402 of various embodiments, illustrating the mechanism in which the Cu NWs 404 may prevent crack propagation and reinforce the mechanical strength of the bond.

In various embodiments, in spite of the nanoscale Cu particle size, low (~0.2 $T_m$) process temperature and short annealing time (<1 hr) may not lead to 100% densification. As a result, the area of grain boundary and the density of voids may not be eliminated completed. Thus, there would likely be crack propagation path(s) which may lead to the degradation of mechanical strength. Nevertheless, as shown in FIG. 4A, the Cu NWs 404 which are inserted into the Cu NPs 402 may obstruct the propagation of crack and may retard crack growth, thereby improving the mechanical properties. Therefore, the presence of Cu NWs 404 in the conductive member of various embodiments, after heating of the conductive Cu paste, may improve the mechanical properties of the conductive member by minimising the propagation of crack(s) that may occur in the conductive member.

Figure 4B:
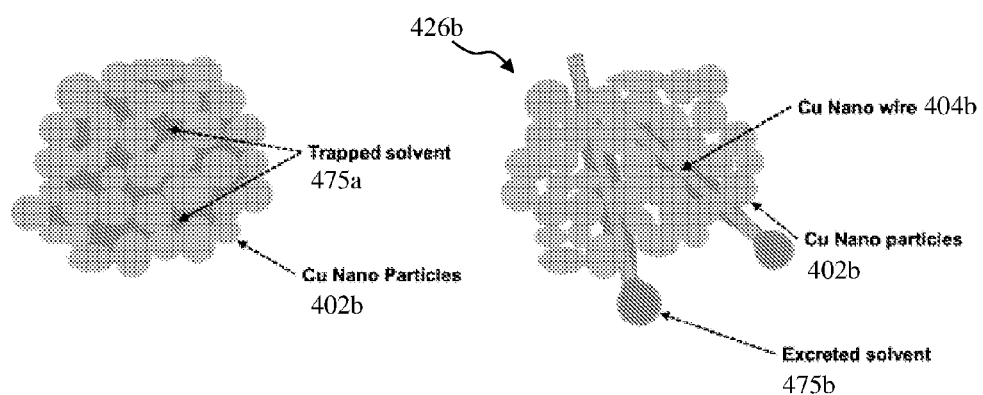
FIG. 4B shows schematic diagrams illustrating the solvent extraction effect with nanowires in nanoparticles paste of various embodiments.

FIG. 4B shows schematic diagrams illustrating the solvent extraction effect with nanowires 404b in the Cu nanoparticles bonding layer 426b of various embodiments to illustrate the second effect of NWs in Cu NPs bonding. In Cu NPs bonding, the paste may contain different kinds of solvents as well as organic capping layer around the Cu NPs. However, after sintering by heating, some of the solvents 475a may still remain and may be trapped in the sintered Cu NPs layer, between the Cu NPs 402b, as shown in FIG. 4B. On the other hand, in the NP+NW composite bonding layer 426b, the nanowires 404b may make slits in the isolated region and act as diffusion pathways for the chemicals or solvents 475b to be removed into the surrounding, as shown in FIG. 4B.

Figure 5A:
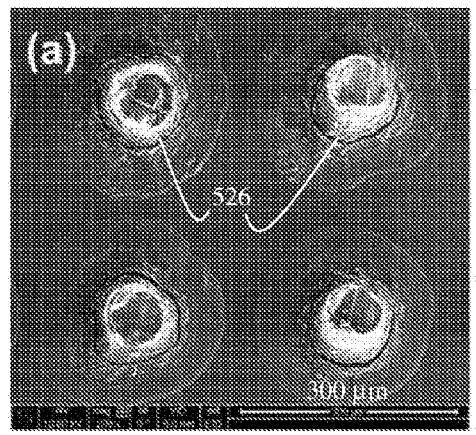
FIGS. 5A and 5B show scanning electron microscope (SEM) images of copper (Cu) pillar formed using the nano copper (Cu) paste of various embodiments.
Figure 5B:
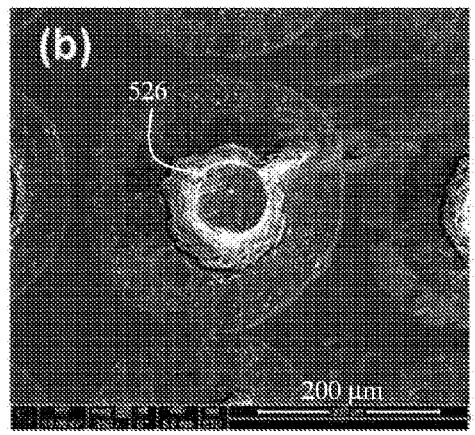

The conductive copper paste of various embodiments may be used for copper (Cu) pillar bump bonding for 3D integration (see, for example, FIGS. 5A and 5B). The conventional method for Cu pillar formation is to use electroplating, which typically takes a long time (0.5-1 hr). Thus, substitute processes have been investigated, and screen printing or ink jet printing method using Cu paste is considered as one of the strong candidates. Nevertheless, one of the biggest concerns of Cu bump formation using Cu paste is cracking in the bumps during sintering. Many of the previous studies reported that as the thickness of the film (bump) or coating increases, more cracks are generated and propagated. Therefore, the formation of thick Cu pillar (about 10-100 µm) without cracks is the challenge for Cu pillar bump bonding using nanoparticles.

Two types of Cu bump formations were made using Cu paste: nano Cu particles and nano Cu particles with nanowires. As shown in FIGS. 5A and 5B, Cu pillars (or Cu conductive members) 526 formed using the nanowires imbedded nano Cu paste of various embodiments has reduced crack generation and propagation significantly.

Figure 6A:
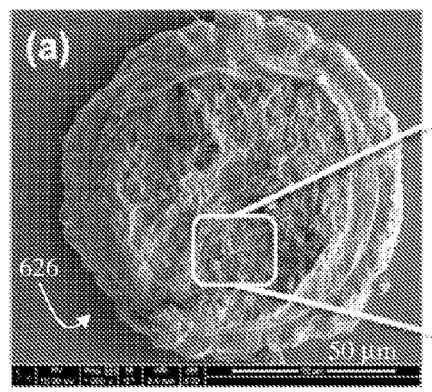
Figure 6B:
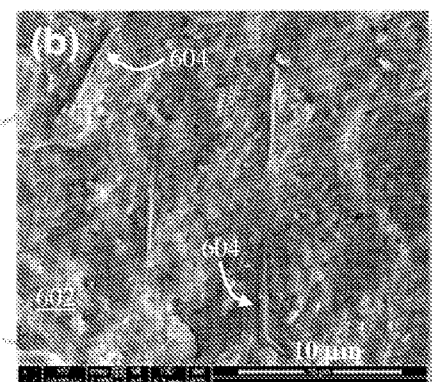
Figure 6C:
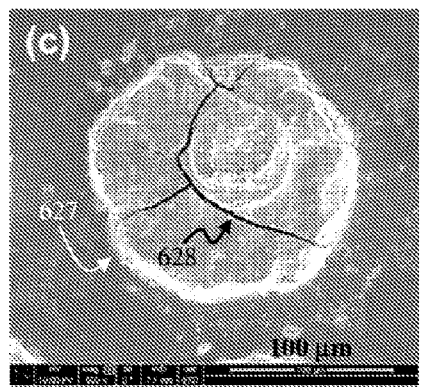
FIGS. 6C and 6D show scanning electron microscope (SEM) images of copper (Cu) bumps formed from a copper paste without nanowires.
Figure 6D:
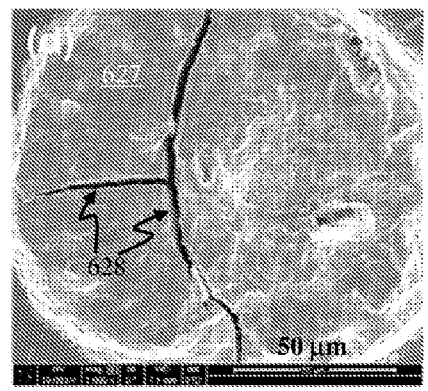

FIGS. 6A and 6B show scanning electron microscope (SEM) images of copper (Cu) bumps 626 formed from a copper paste with nanoparticles 602 and nanowires 604 of various embodiments, while FIGS. 6C and 6D show scanning electron microscope (SEM) images of copper (Cu) bumps 627 formed from a copper paste without nanowires. As shown in FIGS. 6A and 6B, scanning electron microscope (SEM) analysis reveals the failure surface of the chip and shows that the nanowires (NWs) 604 mixed well with the fused NPs 602. It also shows that the NWs 604 bridge across the cracked regions within the bonded NPs 602. It may be suggested that these NWs connections improve the mechanical properties as well as the electrical properties. In contrast, as shown in FIGS. 6C and 6D where nanowires are absent, cracks 628 may propagate through the Cu bumps 627.

FIGS. 7A to 7D show scanning electron microscope (SEM) images of the microstructures of the fracture surface of the copper (Cu) nanoparticles (NPs) and nanowires (NWs) composite joining bonded at 200° C. As shown in FIGS. 7A-7D, Cu NWs 704 (the ellipses shown in FIG. 7A indicate where some NWs are) are mixed with the fused NPs 702.

Figure 7E:
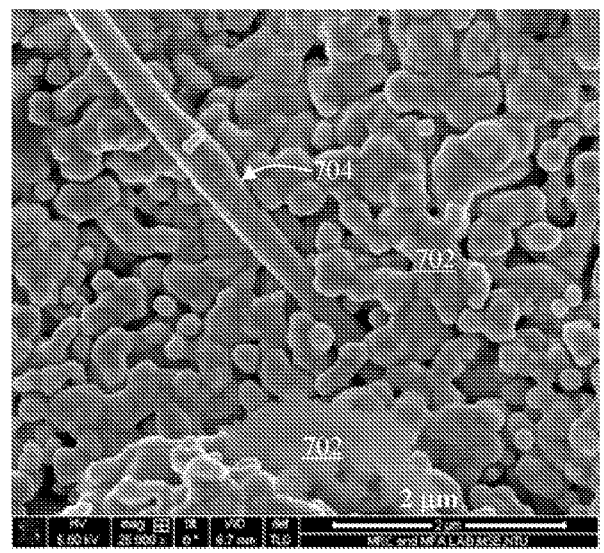
FIG. 7E shows a scanning electron microscope (SEM) image illustrating the microstructures of the bonding layer formed using the copper paste of various embodiments.

FIG. 7E shows a scanning electron microscope (SEM) image illustrating the microstructures of the bonding layer formed using the copper paste of various embodiments. A copper nanowire 704 may be clearly observed among the fused copper nanoparticles 702.

Figure 8:
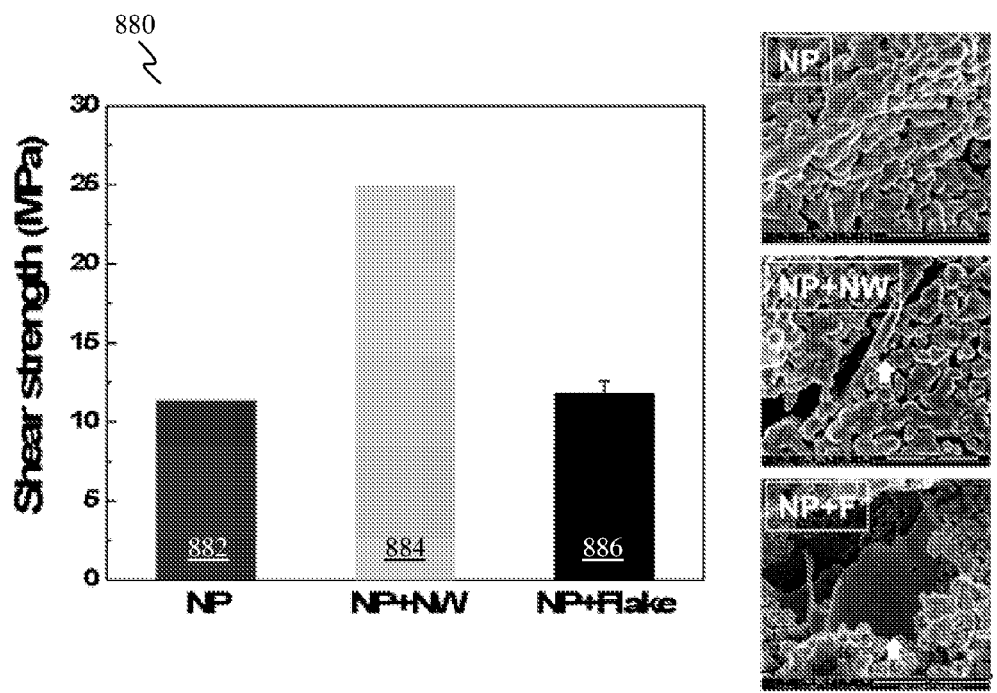
FIG. 8 shows a plot of shear strengths for various copper (Cu) nanostructures.

Mechanical chip shear tests using a shear test machine was carried out and the shear strengths of three different samples: NP only, NP+NW, NP+flake (~100 µm) samples were compared. FIG. 8 shows a plot 880 of shear strengths for various copper (Cu) nanostructures, illustrating shear strength variation with nano-structures. Plot 880 shows result 882 for the sample with nanoparticles only, result 884 for the sample with nanoparticles and nanowires, and result 886 for the sample with nanoparticles and flakes. The SEM images of the fracture surface of the corresponding nanostructures are also shown in FIG. 8. The results of the shear tests show that the mixture which was added with NWs show the higher value (result 884) in bonding strength. As shown in FIG. 8, the shear strength of the NP+NW composite sample (result 884) is twice as high as for the other samples. The NP+flake mixture was also applied to compare the effect of large particle sizes (~100 µm) present in the composite, but unlike the NP+NW sample, it does not work as the presence of the flakes does not increase the shear strength as compared to the sample having nanoparticles only. That is, the composite strengthening effect can only be seen in small size long structures such as the nanowires.

In various embodiments, Cu nanowires with a diameter of about 100-200 nm and a length of about 20-50 µm (aspect ratio: about 100-500) and Cu nanoparticles with a diameter of about 5-20 nm may be used. The weight ratio of Cu NPs to Cu NWs is from about 1:1 to about 50:1, for example, between about 10:1 and about 50:1. Examining a range of size, length, ratio of Cu NWs to nanoparticles, an optimal composition may be determined for the required mechanical properties and electrical properties. Accordingly, the process temperatures may be varied sensitively for better bonding performance depending on the nanoparticle size. It has been found that with larger Cu nanoparticles between about 40 to 100 nm, the same 'nanowire effect' may be achieved, but the optimized process temperature increase to about 300-350° C. Therefore, even though different sizes of nanoparticles may be employed in various embodiments, only the bonding conditions would be modified, but the concept of materials and property improvement mechanism are preserved.

The relationship between the configuration of nanowires which contain some nanoparticles and their mechanical property may be investigated as well. While there was a study on the relationship between the fraction of silver (Ag) nanowires to particles and the mechanical strength, the length of the chemical synthesized nanowires are not even or uniform. For this reason, it is difficult to determine if the results of the study demonstrate the relationship between the fraction of nanowires and the mechanical strength. Nevertheless, nanowires which are synthesized by chemical or vapor methods may still be applicable in various embodiments, because even though they have less effect, it may still be applicable in terms of the methodology and mechanism.

Figure 9A:
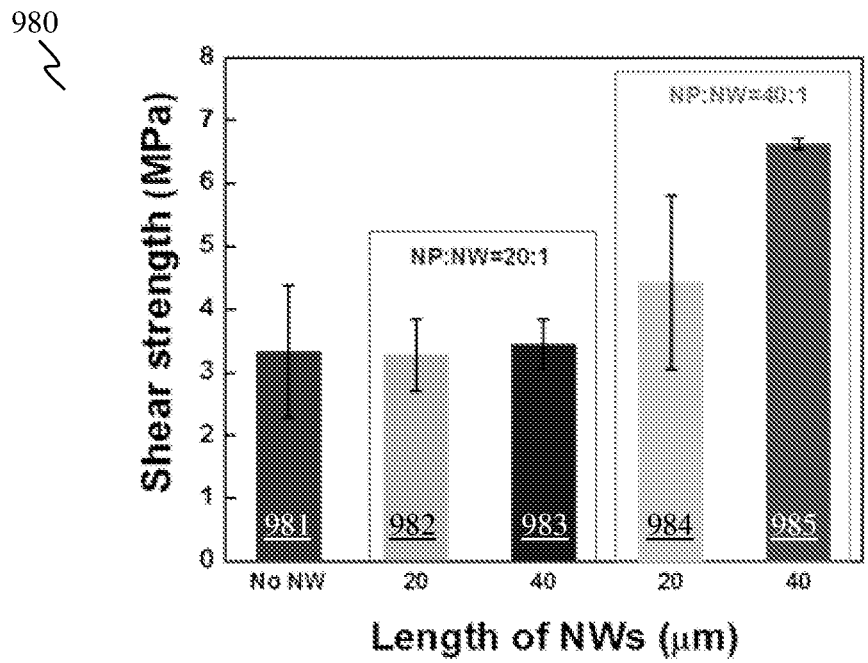
FIG. 9A shows a plot of shear strength variation with the length and the weight ratio of the nanoparticles to the nanowires.

FIG. 9A shows a plot 980 of shear strength variation with the length and the weight ratio of the nanoparticles to the nanowires. Plot 980 shows result 981 for a sample without nanowires, results 982 and 983 for samples with nanowires having lengths of about 20 µm and about 40 µm respectively for a weight ratio of nanoparticles to nanowires of about 20:1, and results 984 and 985 for samples with nanowires having lengths of about 20 µm and about 40 µm respectively for a weight ratio of nanoparticles to nanowires of about 40:1. As shown in FIG. 9A, the weight ratio of nanowires to nanoparticles may affect the mechanical bonding strength. Through the mechanical tests with different fractions (or weight ratios) of NWs to NPs, it is found that, at a certain ratio of NPs:NWs, the enhancement effect may be maximized. Besides, under and over the certain ratio, the effect of NW addition becomes smaller. In various embodiments, it is found that the effective weight ratio of NPs:NWs is 40:1 for optimum mechanical bonding strength.

Figure 9B:
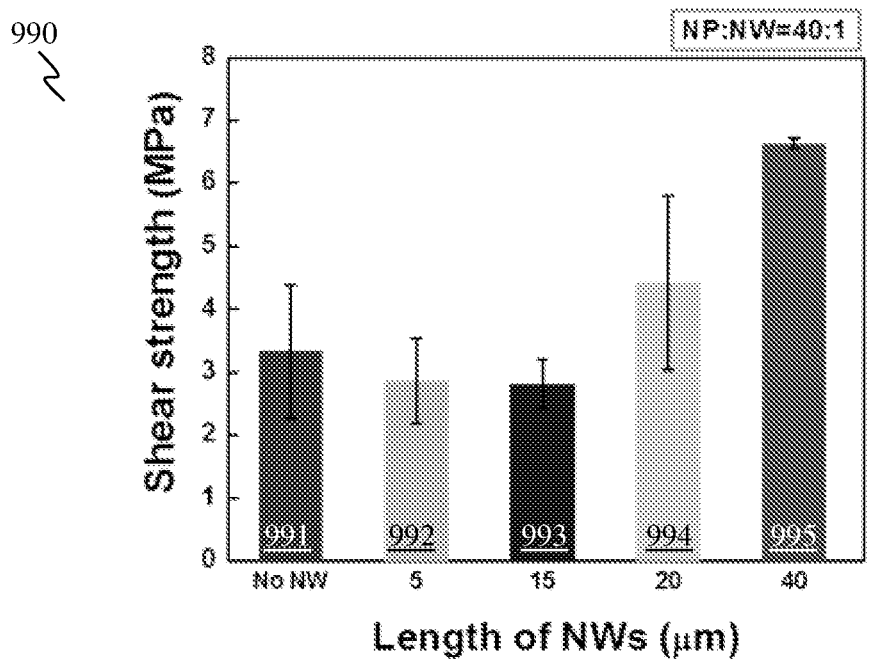
FIG. 9B shows a plot of shear strength variation with the length of nanowires.

When the ratio of NPs:NWs is fixed at the optimized condition (i.e., 40:1), the optimum length of the nanowires may be determined. FIG. 9B shows a plot 990 of shear strength variation with the length of nanowires, with the weight ratio of the nanoparticles to the nanowires fixed at 40:1. Plot 990 shows result 991 for a sample without nanowires, result 992 for a sample with nanowires having a length of about 5 µm, result 993 for a sample with nanowires having a length of about 15 µm, result 994 for a sample with nanowires having a length of about 20 µm, and result 995 for a sample with nanowires having a length of about 40 µm. As shown in FIG. 9B, the bonding layer containing longer nanowires shows a higher bonding strength. The effect of the length of the nanowires could be verified more accurately with electroplated nanowires as the lengths of the electroplated nanowires are at least substantially uniform.

Figure 10A:
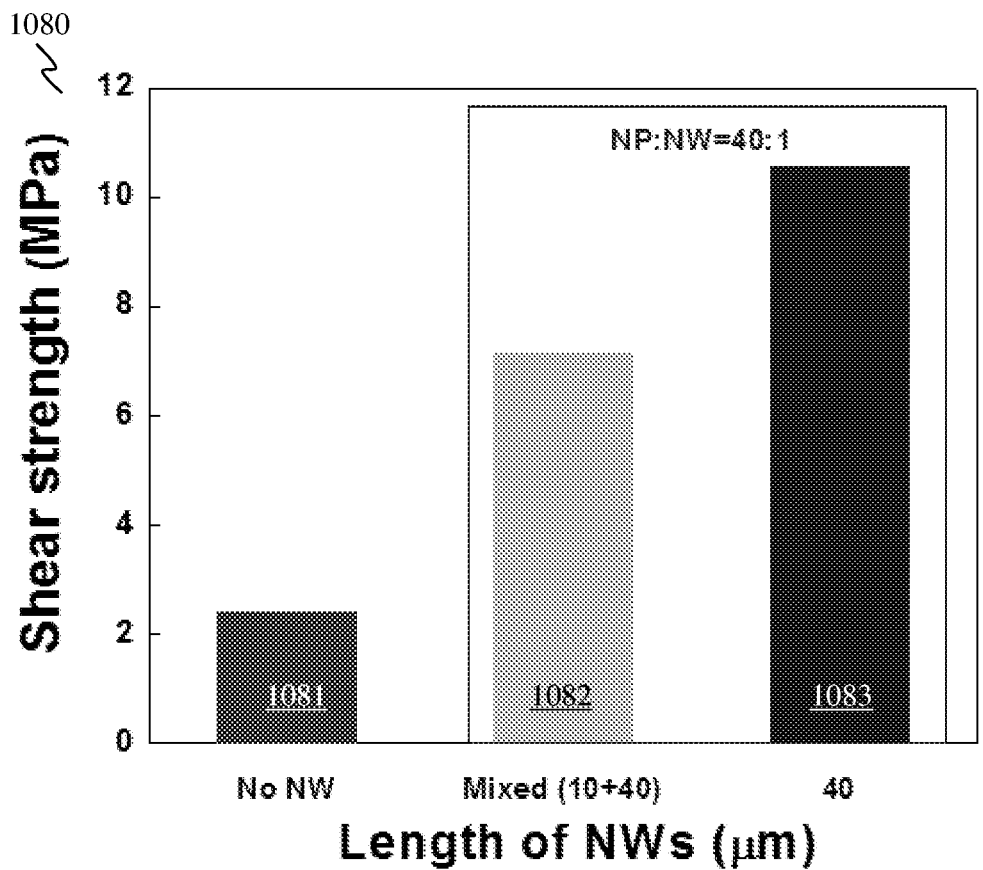
FIG. 10A shows a plot of shear strength variation with the length of nanowires.

FIG. 10A shows a plot 1080 of shear strength variation with the length of nanowires. Three different sample pastes were examined: without nanowire (result 1081), mixed with two different lengths (10 µm and 40 µm) of nanowires (result 1082) and mixed with uniform length (40 µm) of nanowires (result 1083), with the ratio of the nanoparticles to the nanowires fixed at about 40:1 by weight. The samples were bonded via heating at about 230° C. (peak temperature) for about 90 seconds (peak time duration). The effect of distribution of the length of the nanowiress may be determined. which as shown in FIG. 10A, the sample with nanowires (results 1082, 1083) show a higher shear strength than the sample with no nanowire (result 1081), and the sample having uniform length nanowires (result 1083) shows a higher shear strength than that of the sample having mixed lengths (result 1082).

Figure 10B:
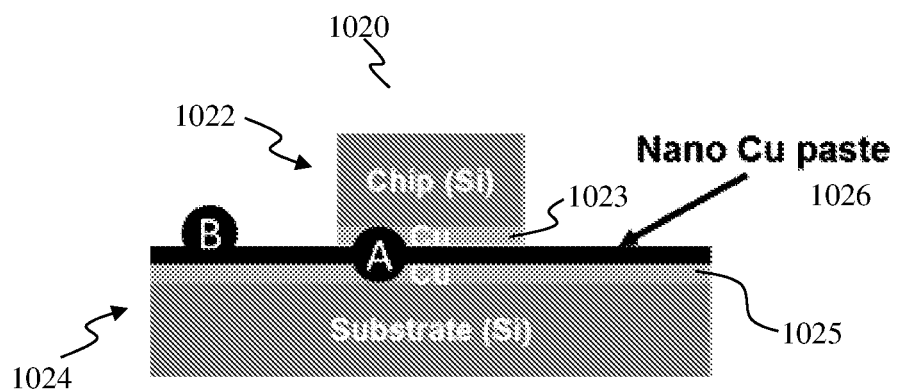
FIG. 10B shows a schematic cross sectional view of an electrical device, according to various embodiments.

FIG. 10B shows a schematic cross sectional view of an electrical device 1020, according to various embodiments, illustrating a bonding structure with a nano copper (Cu) paste 1026. The nano copper (Cu) paste 1026 may be provided between a first substrate portion (e.g., silicon (Si) chip) 1022 having a copper layer 1023 and a second substrate portion (e.g., silicon (Si) substrate) 1024 having a copper layer 1025, where the paste 1026 may be heat treated to interconnect and/or bond the first substrate portion 1022 and the second substrate portion 1024 to each other.

Figure 10C:
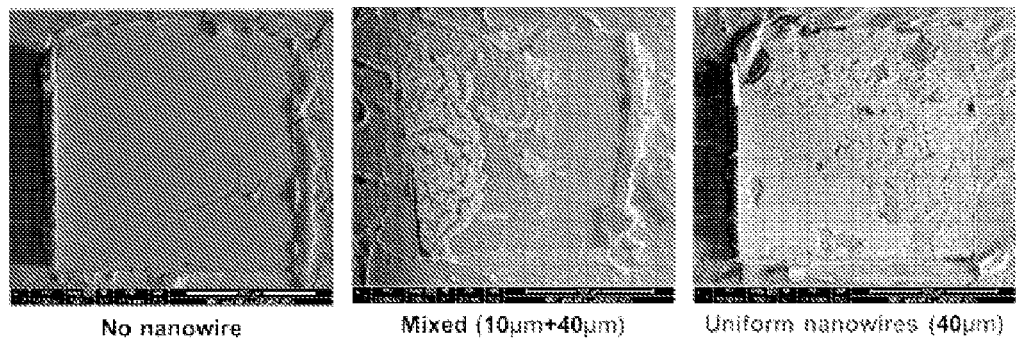
FIGS. 10C and 10D show scanning electron microscope (SEM) images taken at positions "A" and "B" respectively indicated in FIG. 10B. Each scale bar represents 500 µm.
Figure 10D:
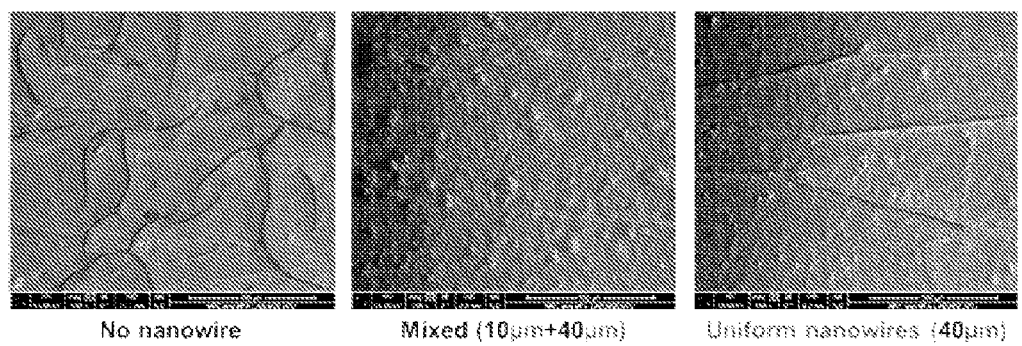

FIGS. 10C and 10D show scanning electron microscope (SEM) images taken at positions "A" and "B" respectively indicated in FIG. 10B. FIG. 10C shows SEM images of the surface morphology, at position "A", after shear test for three different samples corresponding to those employed for obtaining the results of FIG. 10A. The sample without nanowires shows a flat and clean interface failure mode, and the samples with mixed length nanowires and uniform length nanowires show mixed and cohesive failure modes respectively. These results may be explained that the nanowires prevent crack propagation, and long and uniform nanowires are more effective than mixtures of nanowires with different lengths. These results correspond well with the shear strength results of FIG. 10A.

FIG. 10D shows SEM images of the surface morphology of the surface, at position "B", after dispersion of the nano Cu paste 1026. The sample without nanowires shows a lot of cracks on the surface, but the samples with nanowires show no or minimal cracks.

In various embodiments, when a certain or predetermined size of nanoparticles (e.g., 5-20 nm) is used, the optimized weight ratio and length of nanowires are found to be about 40:1 (NPs:NWs) and ~40 µm, respectively. In a similar manner, when different sizes of NPs and NWs are applied, the optimum ratio and length may also be changed.

Figure 11:
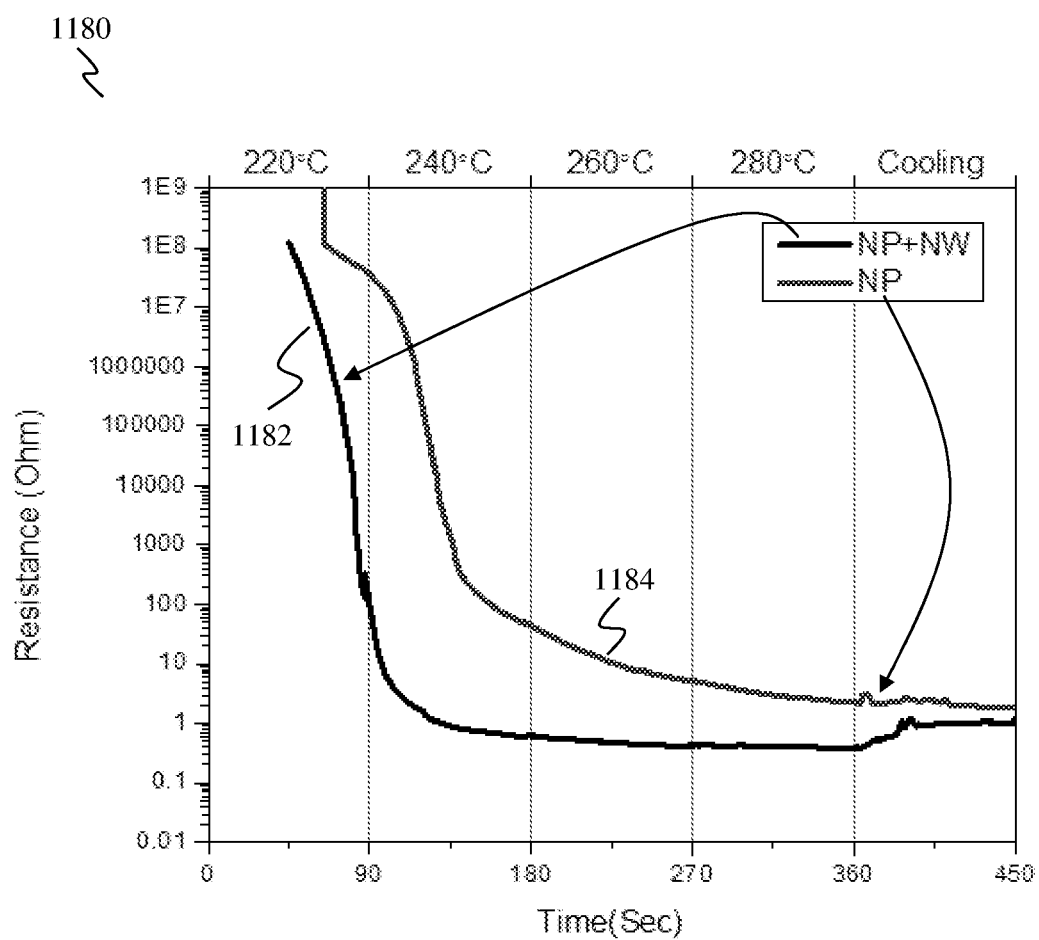
FIG. 11 shows a plot of in-situ resistance measurements for copper pastes.

FIG. 11 shows a plot 1180 of in-situ resistance measurements for two different samples of nano copper (Cu) pastes having Cu nanoparticles, and with Cu nanowires (result 1182) or without nanowires (result 1184). The samples were annealed in a reflow oven with five zones having different temperature profiles, which were 220° C., 240° C., 260° C., 280° C. and Cooling. Plot 1180 shows that the resistance of the sample with nanowires (result 1182) drops more rapidly than the sample without nanowires (result 1184), and reaches the <10Ω range at the 240° C. zone, and the resistance is quite stable. The results 1182, 1184 show that the process temperature for the paste with nanowires may be lower than the paste without nanowires. The results 1182, 1184 demonstrate that nanowires help to improve the electrical properties for nano Cu paste joining, corresponding with the results shown in FIG. 10A.

It is estimated that the global market for Flip Chip Technology by wafer bumping process reached $18.9 billion in 2012. This market is estimated to be $20.1 billion in 2013 and expected to grow to $36.5 billion in 2018. Copper (Cu) pillar process, as a segment, is estimated to be $7.3 billion in 2013. It is further expected to grow to nearly $24.9 billion in 2018. Various embodiments may be applied for packaging material: three dimensional integrated circuit (3D IC) joining, power electronics soldering, high reliability bonding. It is expected that high stability alloy solder materials containing expensive novel metals (gold (Au), silver (Ag), platinum (Pt)) may be replaced with the material of various embodiments, because it shows comparable electrical and mechanical properties and much higher reliability even for a lower price. Moreover, costs may be reduced by eliminating some procedures in the packaging process: formation of capping or barrier layer on a Cu bump and Under Bump Metallization (UBM) on a Cu bump or line.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

The invention claimed is:

1. A conductive paste having a composition comprising a plurality of conductive nanoparticles and a plurality of conductive nanowires, wherein a weight ratio of the plurality of conductive nanoparticles to the plurality of conductive nanowires is between 10:1 and 50:1.

2. The conductive paste as claimed in claim 1, wherein each conductive nanoparticle of the plurality of conductive nanoparticles has a size of between 5 nm and 20 nm.

3. The conductive paste as claimed in claim 1, wherein each conductive nanowire of the plurality of conductive nanowires has a length of between 5 μm and 50 μm.

4. The conductive paste as claimed in claim 1, wherein the plurality of conductive nanowires have uniform length.

5. The conductive paste as claimed in claim 1, wherein each conductive nanowire of the plurality of conductive nanowires has a diameter of between 100 nm and 200 nm.

6. The conductive paste as claimed in claim 1, wherein each conductive nanowire of the plurality of conductive nanowires has an aspect ratio of between 50 and 500.

7. The conductive paste as claimed in claim 1, wherein the plurality of conductive nanowires comprise a metal and wherein the metal is selected from the group consisting of copper, silver and gold.

8. The conductive paste as claimed in claim 1, wherein the plurality of conductive nanoparticles and the plurality of conductive nanowires comprise copper.

9. The conductive paste as claimed in claim 1, wherein each conductive nanoparticle of the plurality of conductive nanoparticles is encapsulated with an organic layer.

10. The conductive paste as claimed in claim 9, wherein the organic layer comprises an amine.

11. A method for forming an interconnection comprising:
applying a conductive paste as claimed in claim 1 between a first substrate portion and a second substrate portion; and
fusing the plurality of conductive nanoparticles of the conductive paste to each other to interconnect the first substrate portion and the second substrate portion.

12. The method as claimed in claim 11, wherein fusing the plurality of conductive nanoparticles of the conductive paste to each other comprises subjecting the conductive paste to a heating process.

13. The method as claimed in claim 12, wherein the heating process is carried out for a predetermined duration between 6 minutes and 30 minutes.

14. The method as claimed in claim 12, wherein a predetermined peak temperature of the heating process is between 200° C. and 350° C.

15. The method as claimed in claim 14, wherein the heating process at the predetermined peak temperature is carried out for a predetermined duration of between 90 seconds and 10 minutes.

16. The method as claimed in claim 11, wherein the first substrate portion and the second substrate portion are respectively comprised in separate substrates arranged one over the other.

17. The method as claimed in claim 11, further comprising forming the conductive paste comprising:
providing a plurality of conductive nanoparticles;
providing a plurality of conductive nanowires; and
mixing the plurality of conductive nanoparticles and the plurality of conductive nanowires in a solvent.

18. The method as claimed in claim 17, wherein providing a plurality of conductive nanowires comprises forming the plurality of conductive nanowires by means of an electroplating method using an anodic aluminum oxide as a template.

19. An electrical device comprising:
a first substrate portion;
a second substrate portion; and
a conductive member arranged to interconnect the first substrate portion and the second substrate portion,
wherein the conductive member is made of the conductive paste as claimed in claim 1, the conductive paste processed to fuse the plurality of conductive nanoparticles of the conductive paste to each other.

20. The electrical device as claimed in claim 19, wherein the first substrate portion and the second substrate portion are respectively comprised in separate substrates arranged one over the other.

* * * * *